United States Patent [19]

Britton et al.

[11] Patent Number: 4,785,408

[45] Date of Patent: Nov. 15, 1988

[54] METHOD AND APPARATUS FOR GENERATING COMPUTER-CONTROLLED INTERACTIVE VOICE SERVICES

[75] Inventors: James T. Britton, Aberdeen, N.J.; Lorraine Figueroa, Brooklyn, N.Y.; John F. Patterson, Morristown; Robert I. Rosenthal, Wayside; Richard R. Rosinski, Middletown, all of N.J.

[73] Assignee: AT&T Information Systems Inc. American Telephone and Telegraph Company, Murray Hill, N.J.

[21] Appl. No.: 710,605

[22] Filed: Mar. 11, 1985

[51] Int. Cl.⁴ .................... G10L 5/00; G06F 15/20
[52] U.S. Cl. ........................... 364/513.5; 364/300
[58] Field of Search ............... 379/93, 91; 381/51–53; 364/513.5, 300, 456, 516

[56] References Cited

U.S. PATENT DOCUMENTS

| | | | |
|---|---|---|---|
| 4,060,848 | 11/1977 | Hyatt | 381/51 |
| 4,084,237 | 4/1978 | Beachem et al. | 364/400 |
| 4,315,315 | 2/1982 | Kosslakoff | 364/300 |
| 4,455,619 | 6/1984 | Masui et al. | 364/900 |
| 4,553,222 | 11/1985 | Kurland et al. | 364/900 |
| 4,602,129 | 7/1986 | Matthews et al. | 379/89 |

Primary Examiner—Emanuel S. Kemeny
Attorney, Agent, or Firm—John A. Caccuro

[57] ABSTRACT

A user-application program for computerized telephone ordering is generated by a system designer who selects and interconnects pre-defined program modules and subroutines using a graphics terminal. The application program allows TOUCH-TONE input data and voice response. The present invention describes a Dialog Production System (DPS) for generating application programs for instructing a computer-controlled voice response system to provide computer-controlled voice services. The DPS includes interaction modules, each defining a basic end-user transaction which can be performed by the system, and methods for specifying module interconnection. Each interaction module controls the intercommunications with other modules and controls the devices which interface to the system. To design a dialog program to implement the desired voice service the system designer uses a graphic terminal to select and interconnect the modules to define the sequence of transactions needed to implement the desired voice service.

9 Claims, 24 Drawing Sheets

FIG. 24

| NODE # | CODE | FORMAT | CHLDCT | CHILD 1 | CHILD 2 | ... | CHILD 6 |
|--------|------|--------|--------|---------|---------|-----|---------|
| FORM | ARGCT | LINECT | ARG 4 | • | • | • | ARG N |
| ARG 1 | ARG 2 | ARG 3 | | • | • | • | |
| FORM 2 | ARGCT | LINECT | ARG 4 | • | • | • | ARG N |
| ARG 1 | ARG 2 | ARG 3 | | • | • | • | |
| FORM 3 | ARGCT | LINECT | ARG 4 | • | • | • | ARG N |
| ARG 1 | ARG 2 | ARG 3 | | • | • | • | |

METHOD AND APPARATUS FOR GENERATING COMPUTER-CONTROLLED INTERACTIVE VOICE SERVICES

TECHNICAL FIELD

This invention relates to programmable communication systems and more particularly to a method and apparatus for generating computer-controlled voice services which involve interactions between a system and system users.

BACKGROUND OF THE INVENTION

A TOUCH-TONE telephone is a widely available device which can access business computer systems to provide a variety of customer services. It can function as a user terminal for any system application which accepts TOUCH-TONE signaling as a user input and provides audio or voice response output to the user. Such applications include Data In/Voice Answer (DIVA) applications, Voice In/Voice Out (VIVO) applications and Voice Store and Forware (VSF) applications. Such DIVA, VIVO and VSF services (e.g., Inquire-Response, Order Entry, Voice Forms, etc.) require that a well engineered dialog be created to control the interaction between the end-user and the system. Creation of such dialogs is the critical part of a customer application. Since each application can differ both in its logical structure and its specific content, each application dialog must be custom-designed. Unfortunately, the myriad of custom applications often require that businesses spend considerable amounts of money to hire programmers to write and maintain these custom programs. What is desirable is to provide an arrangement whereby the non-programmer employees of a business can be utilized to develop these customized programs.

SUMMARY OF THE INVENTION

The present invention provides method and apparatus to enable a system designer or producer to create application programs for instructing a computer-controlled voice response system to provide a desired user interactive voice service. The present invention referred to herein as the dialog production system (DPS) is embodied in the system and utilizes a high level interactive environment which enables the system designer (program producer) to generate a dialog application program to implement the desired telephone/computer interactive customer service. According to the invention, the program producer selects interaction modules from a group of predefined interaction modules, each module defining one of the possible functions which can be performed by the system, and specifies the method or means for interconnecting these modules. These interaction modules control the intercommunications between the devices (e.g., a digit collector, signal generator, etc.) used to implement the particular voice service. By selecting two or more of these interaction modules including the defining of selectable parameters or indices and specify the interconnection of these modules, the desired dialog program is implemented.

BRIEF DESCRIPTION OF THE DRAWINGS

The detailed description of the overall system operation of the present invention will be more fully appreciated from the illustrative embodiments shown in the drawings, in which:

FIG. 24 shows the format of a table describing the indices necessary to specify interconnection of modules at a node and to enable linkage to other nodes.

GENERAL DESCRIPTION—BACKGROUND

Before describing the present invention, it may be helpful to generally describe the operation of a telephone communication system in which the claimed Dialog Production System (DPS) for generating computer-controlled voice services may be utilized. It should be recognized that the present invention may also be utilized in other similar type communication systems or as a stand-alone system. Since such systems utilize a variety of hardware and programming techniques, no attempt is made to describe the operation of any system in which the present invention may be utilized. However, the present invention must be blended into the overall program structure of the system in which it is used and must be tailored to mesh with other features and operations of the system. Thus, in order to avoid confusion and in order to enable those skilled in the art to practice the claimed invention, this specification will describe the operation of the DPS using flow charts which describe the logical steps and the various parameters required to implement the invention.

Figure 3:
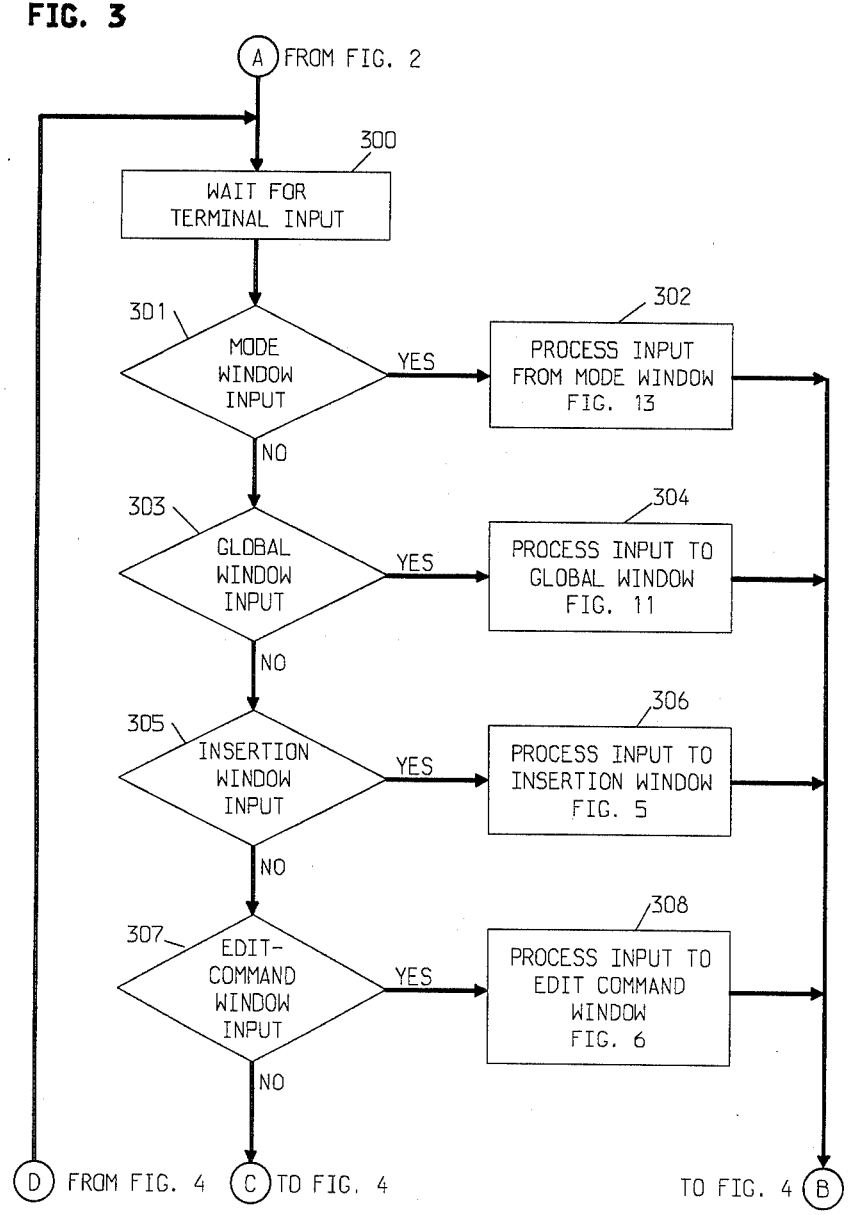

In the description that follows reference numbers are used to identify apparatus or parts of flow charts depicted in a Figure. The Figure which contains the particular reference number can be determined by using the first digit when 3 digit reference numbers are used (e.g., 310 refers to FIG. 3) and by using the first and second digits when 4 digit reference numbers are used (e.g., 1005 refers to FIG. 10).

Figure 1:
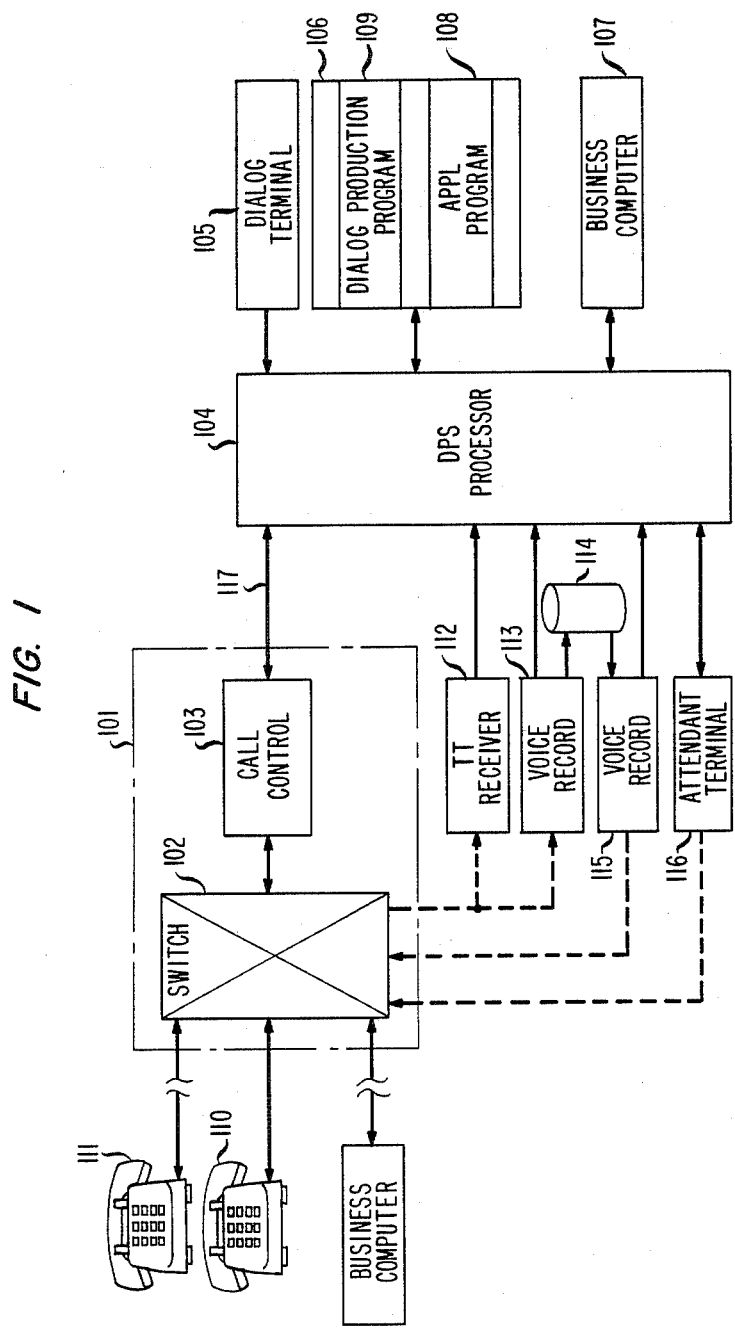
FIG. 1 shows a block diagram of apparatus which may be utilized to practice the present invention.

FIG. 1 shows a block diagram of one embodiment of a system that may be used to practice the present invention. The system of FIG. 1 includes a communication system 101 including switch 102 and call or controller 103. In addition to its use with the present invention, communication system 101 may be used to establish and complete calls to the DPS location. According to the present invention, communication system 101 is used to implement the operation of application programs (i.e., dialog programs) generated by the DPS. DPS system equipment includes DPS processor 104, dialog terminal 105 and memory 106 and may also include business computer 107. As will be discussed in more detail later a DIVA application program 108 is generated according to the present invention by a dialog producer using dialog terminal 105, processor 104 and the dialog production program 109. Once generated the DIVA application program 108 is stored in memory 106 and accessed in response to customer (i.e., user) calls or inquiries made to DPS processor 104 via communication system 101.

The operation of a typical DIVA application program 108 can been seen in tracing a service request when it is accessed by a customer. In the description that follows the word customer is used interchangeably with the words user or caller. A caller from either a local station at 110 or from a remote station set 111 (connected appropriately via CO line 112) can initiate a service request. The caller is connected by call control 103 through switch 102 to the voiceware equipment associated with the application. This voiceware equipment typically includes multi-frequency receiver 112, voice recorder 113, voice storage unit 114, voice retrieve unit 115 and attendant terminal 116 which access various ports of switch 102 to receive voice and touch-tone signaling. The DPS processor 104 operates under control of application program 108 to receive status from and control the operation of the voiceware equipment. The DPS processor is responsive to control signals received over channel 117 from call control unit 103.

Typically, as will be discussed in detail in later paragraphs, the DIVA application program includes modules which control the voiceware equipment to answer an incoming call, retrieve the appropriate speech response from units 114 and 115, and play it (e.g., an initial announcement) to the caller. The response may also include a request for a user account number or other user provided information.

The caller inputs the requested data by means of Touch-Tone signaling. Touch-Tone receiver 112 decodes the signals into ASCII characters, and sends them to DPS processor 104. The application program 108 includes modules which use this information to branch or select the next part of the application program to be performed. The next step may request other caller information, summon an attendant at terminal 116, request information from a remote data base in business computer 107, or take some other action under DIVA application program 108 control. In an Inquiry-Response example, DIVA application program 108 formats a request to the remote data base, receives a response, and plays back, to the customer, an appropriate announcement. If an attendant is needed, the DIVA application signals call control unit 103 to have switch 102 transfer the call to the attendant extension, the application may then display on the attendant's terminal 116 any information relevant to the transaction. The application program then disconnects from the caller, leaving that line free to accept another call.

While the present invention is described utilizing TOUCH-TONE user inputs and system voice outputs it should be understood that it is contemplated that other application could use other types of user inputs and system outputs. Thus, for example, within the scope of the present invention it is contemplated that system voice recognition equipment can be utilized to respond to user voice inputs. Moreover, if the telephone or other user input terminal utilized as a system input device includes visual indicators (i.e., LEDs or displays) the system output to the user may include signals for display by these indicators.

The apparatus utilized in FIG. 1 are well known. For example communication system 101 can be any variety of PBX systems (e.g., American Telephone and Telegraph (AT&T's) System 85). DPS processor 104 can be a stand alone processor (e.g., AT&T's 3B2 processor) or can be incorporated as a utility program in call control unit 103 or made part of business computer 107. Dialog terminal 105, attendant terminal 106 and the other equipment 112, 113, 114 and 115 can be any of a variety of well known apparatus. While the present embodiment of dialog terminal 105 utilizes a touch sensitive screen to select the various displayed operating parameters of DPS, it is understood that other methods of selecting the displayed parameters including mouses, cursor control and keyboard entry could be used therewith.

The following paragraphs describe an embodiment of a dialog production system (DPS) in accordance with the present invention. The architecture of the DPS comprises three levels at which the dialog producer (i.e., the system operator who designs dialog programs using DPS) interacts with DPS to specify a particular application's characteristics. At any level, the producer is able to check an application program by running it interpretively from the terminal. An important aspect of DPS is the interface provided for the dialog producer. Because of the nature of the Producer Interface, the producer has enforced upon him/her essentially "top-down" program design discipline. The process of dialog design is broken into three levels, each comprising a different display (FIGS. 14 and 15) on dialog terminal 105. These levels proceed from global to detailed concerns of the application program being designed.

Figure 14:
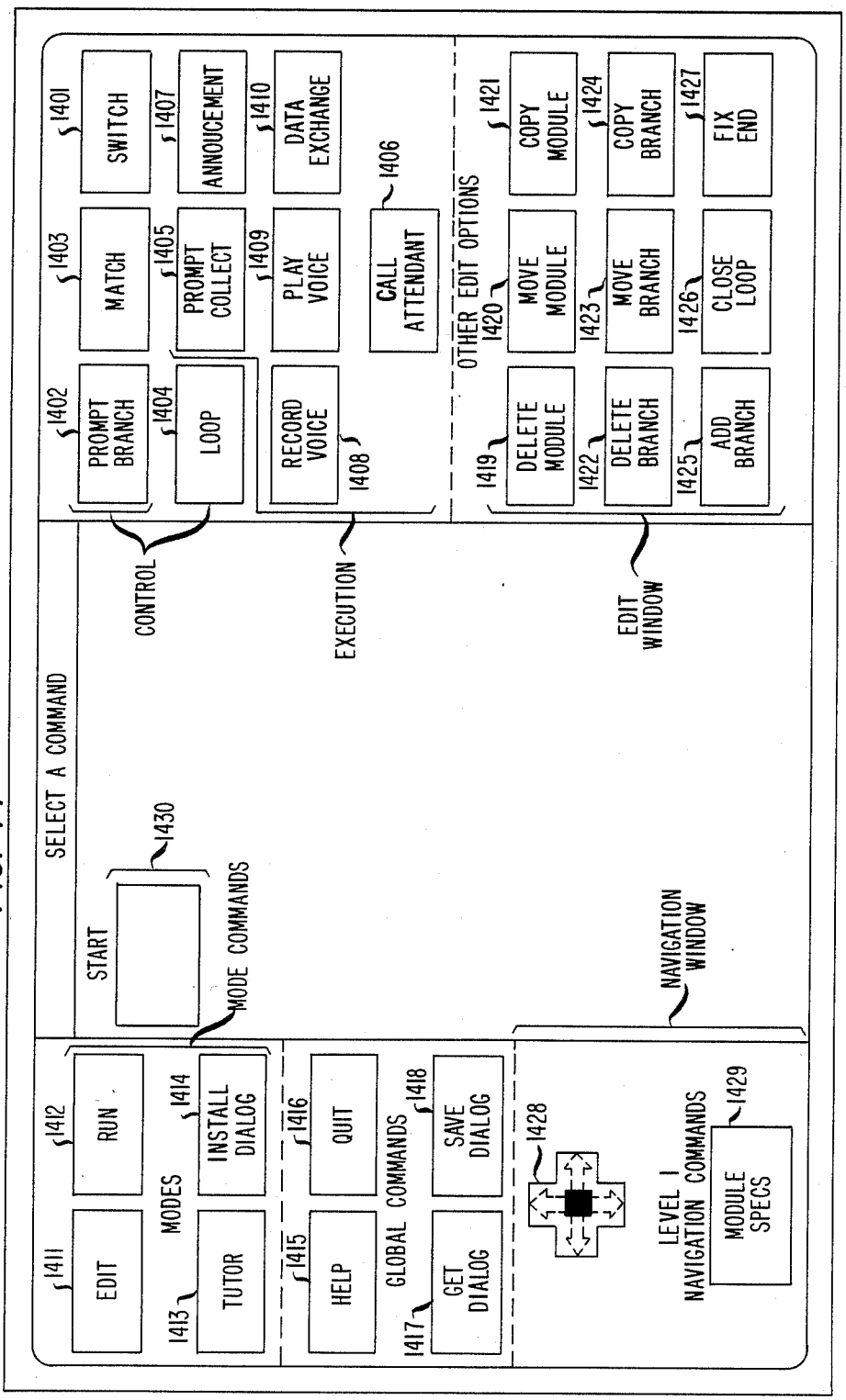
FIG. 14 shows the basic screen display at the start of a dialog creation session.

At Level I, illustrated by FIG. 14, the producer uses a figural, flow-chart like, specification language to indicate the sequence of transactions encountered by the end-user. This allows the producer to describe the program structure using large transaction based units, called Interaction Modules. The overall dialog logic is established by the organization of these interaction modules.

Figure 15:
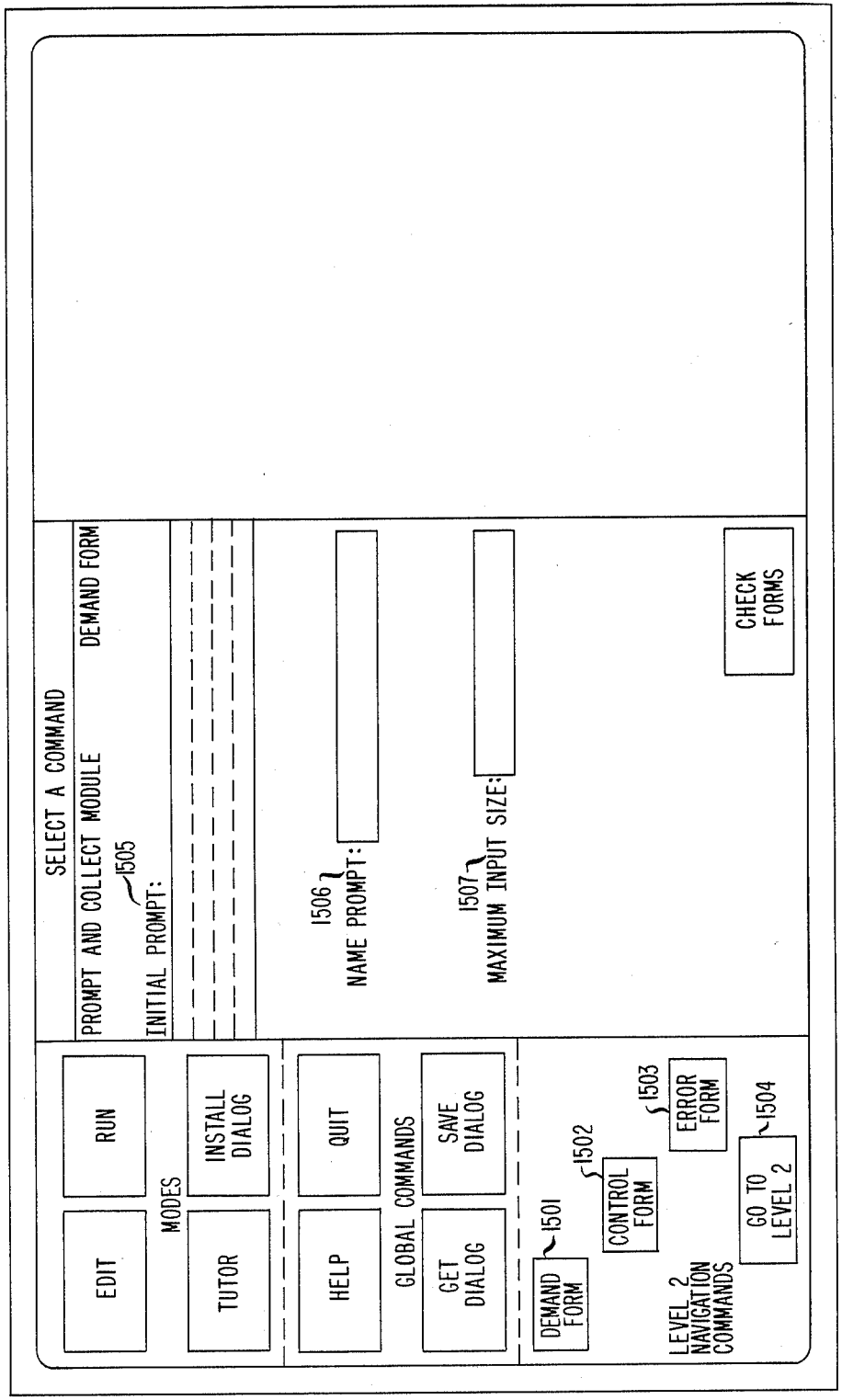
FIG. 15 shows a sample Level 2 screen display.

At Level II, illustrated by FIG. 15, the producer parameterizes each interaction module by specifying the details of transaction handling. The producer interface prompts the producer through this level, suggesting default parameters where appropriate.

Within any interaction module, the producer explicitly sets (or accepts default values of) several parameters. The DPS establishes a required execution environment for the application program. Thus, details that are relevant to the production of good user dialogs (e.g., digit timing standards, error threshold definition, generalized error treatment, announcement interruptability, etc.) are consistent across services, applications, and customers.

At Level III, not illustrated, the DPS prompts the producer to record (or otherwise identify) the specific announcements etc. to be played to the customer. This can be implemented using any number of well known recording techniques.

An easy way to understand the relations among programming modules of the DPS is by means of a flowchart. Such a format provides to the dialog producer a perceptual coding of the relevant information necessary to implement a particular dialog program. The program flow, especially for sequential processes, is perceptually apparent in a flow chart. Flow charts enable tasks to be traced through the underlying semantics of a program. Diagrams or structure charts enforce a modularity on program design that allows the dialog producer to work with higher order program blocks. For example, see M. J. Fitter and T. R. G. Green, "When Do Diagrams Make Good Programming Languages?", *Computer Skills and the User Interface*, New York, Academic Press, 1981.

A complementary dialog specification using decision tables is provided using a production system interface. While decision tables may be difficult to use to understand the flow of a program, decision tables may be most effective in expressing logical relations within portions of a program. For example, see J. E. Bingham and G. W. Davies, *A Handbook of Systems Analysis*, London, Macmillian, 1972.

The DPS includes an interface that uses a hybrid representation consisting of a program structure chart for program construction, combined with forms-based decision tables (within the program modules) to provide an interface that assists the producer in understanding both procedural and structural flow.

Thus, the interaction between the dialog producer and the DPS is designed to assure ease of learning, to improve understanding, and to simplify its use. The producer can design a dialog simply in terms of the transactions that will be experienced by the end-user.

Interaction Modules

Because certain sets of devices are almost always used together (e.g., a digit collector and a signal generator for TOUCH TONE Voice applications) an interactive module can be defined whose purpose it is to control the interrelated activities of the digit collector and an announcement machine. The present invention extends and elaborates on this concept by defining several interaction modules. An interaction module can be thought of as a set of software routines which define all aspects of the necessary interactions between the relevant physical system and the end user for a particular transaction.

Controlling the interrelationships among several hardware devices and the end user is a complex task. The concept of an interaction module allows this complexity to be embedded in the program so as to be invisible to the producer. As the producer adds or otherwise modifies the dialog flow chart the DPS keeps track of the indices or pointers that each node or interaction module needs to point to its' child or successive node. Unless specific branching takes place, control passes to the first child of each node as its' processing is completed.

In Voice services, user transactions share a number of common elements. A group of standard interaction modules implement these common elements, and allow the producer to design a dialog program by specifying the desired application in terms of selected ones of the group of interaction modules. With reference to FIG. 14, the interaction modules include two types of modules: control modules (1401, 1402, 1403 and 1404) and execution modules (1405, 1406, 1407, 1408, 1409 and 1410). Control modules are modules which the producer uses to specify the procedural flow of the application. Execution modules are modules which the producer uses to specify the transaction managed by the application. In addition, there are four indices which the producer uses to indicate the start and end points of the dialog, or of loops within the dialog. The producer then specifies the sequential execution of the Interaction Modules by specifying the spatial arrangement and connection of the modules on the video display of dialog terminal 105.

Control Interaction Modules

The Dialog Production System provides four control interaction modules (1401-1404) for the producer to chose from. These include the Switch, Prompt and Branch, Match and Loop modules.

1. The Switch module (1401) switches between branches of the program depending on an external event. The Switch module capability permits the program producer to specify which of a number of alternative program branches is to be used depending upon preprogrammed external factors such as time of day, day of week, or day of year. Specification of the branch alternatives, and of the temporal criteria is done by the producer using the Level II interface. For example, reporting of current stock quotations with attendant service might be provided during business hours Monday through Friday. At other times, closing quotes could be provided when no attendant is available. To implement this the program producer would write two similar program branches, and utilize the switch module and preprogrammed external factors to decide when each branch is to be active.

2. The Prompt and Branch module (1402) provides the selection or conditional execution of a portion of the application program based on digits input from the user. The Prompt and Branch module plays an announcement to a user, collects dialed digits made in response, and selects the appropriate logical branch of the application program given the input. Branch module provides the producer with the facility of the programming construct Case. At Level II, the predicate outcome table is specified by means of a prompted forms interface.

3. The Match module (1403) provides a similar capability to that of branch, except that user input is not required. The Match module compares two data words and branches based upon the outcome of the comparison.

4. The Loop module (1404) is equivalent to the programming construct "Do Until". That is, the producer specifies a predetermined number of repetitions of a list or sub-tree. The loop variable may be set either on the basis of user input digits, or by a default value specified at Level II.

The functions of execution, branching, and looping are the minimum needed to create dialogs for voice services. Any properly structured program is equivalent to one which contains, at most, functions for Execute, Branch, and Loop. For example, see H. D. Mills, "Mathematical Foundations for Structured Programming", *IBM Report*, FSC 72-6012, February, 1972, pp. 18–83.

Execution Interaction Modules

The Dialog Production System provides 6 execution interaction modules (1405–1410) which the producer choses from to specify the desired task to be executed. These modules include the Prompt and Collect, Call Attendant, Play Announcement, Record Voice, Play Voice, and Data Exchange. Although these modules could logically be decomposed into smaller program blocks, the present invention provides high-level modules because of the basic philosophy underlying the interaction modules. That is, the dialog producer creates applications by specifying modules that correspond to transactions experienced by the end-user.

1. The Prompt and Collect module (1405) handles customer interactions which involve the interactive playing of announcements (via 109 of FIG. 1) and collection of digits (via 111 of FIG. 1). The Prompt and Collect module determines the appropriate range of inputted digits and these digits are stored in a user specified variable and can be referenced by subsequent modules, i.e., Branch, Loop Control or Data Exchange. Errors in input are handled within Prompt and Collect module.

2. The Call Attendant module (1406) is used in those servicss where the program producer may wish to have an attendant (e.g., at terminal 112 of FIG. 1) handle certain transactions, or to connect an attendant if the user makes an error, or to give the end-user the choice of dealing with an attendant instead of the automated service. This module provides a means to connect the end user with an attendant in the program producer's organization. Call Attendant module can be invoked by any other producer interaction machine. When the Call Attendant module is invoked, an announcement is played to the user indicating that an attendant is being summoned. A call is then placed to an attendant and an announcement is played to the attendant informing him/her of the problem. Thereafter, the attendant and the user are connected or bridged together.

3. The play Announcement module (1407) provides the ability to play an announcement during those parts of an application that require no response from the end-user. In addition, Play Announcement enables the recycling of an announcement so that the user can hear it several times if necessary.

4. The Record Voice module (1408) controls all customer relevant interfaces (e.g., 110 of FIG. 1) that are necessary to enable the end-user to leave a single voice message on the producer's voice storage system. This includes opening and closing data records and files. Multiple sequential calls on Record Voice are used to generate a Voice Form. When used in this application, the stored messages are linked together so that they can be retrieved as a complete record consisting of as many fields as there are invocations of prompt and record.

5. The Play Voice module (1409) allows the producer to play "pre-recorded" stored voice out to the end-user. It is implemented much like Record Voice, with the voice file being issued instead of recorded. When used in conjunction with record voice it can provide the user with a simple voice editing capability.

6. The Data Exchange module (1410) enables the producer of a voice service to design the interaction between the application program and a remote business or host computer. The Data Exchange module provides the producer with a simple means of communication with a remote host. Since the data base management system (DBMS) and the nature of the query language may be unknown to the producer and since end-user access to a business computer (107) data base poses significant security problems, a general means to access a remote data base is not provided. When a producer wishes to create a transaction dialog, DPS provides two alternates. First, each set of records from transactions with the end users can be stored and sent to the host for reformatting and processing. Second, DPS allows the producer to automate call management transactions by simulating the activities of a terminal connected to the host or business computer (107).

MODE COMMANDS

Figure 13:
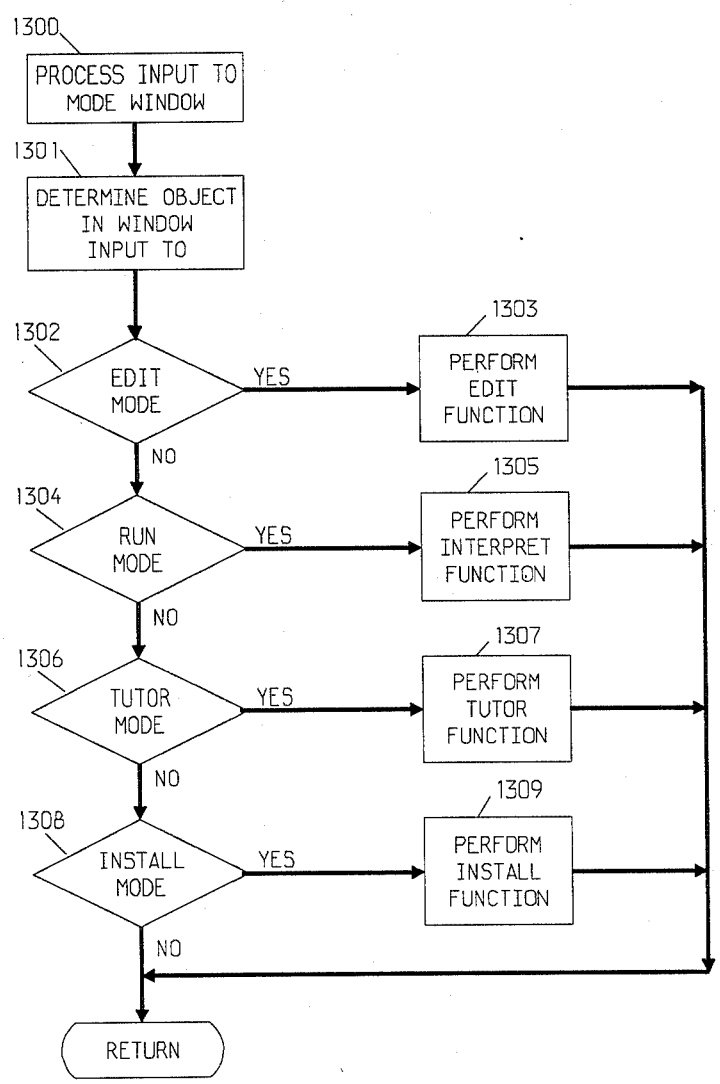
FIG. 13 shows the control process flow for mode commands (RUN, TUTOR, INSTALL DIALOG, EDIT)

The DPS allows the producer to select four modes of operation (Edit, Run, Tutor and Install). These commands are displayed, respectively, as 1411, 1412, 1413 and 1414 in the upper left-hand corner of FIGS. 14, 15 and 16. The following description references FIG. 13.

Figure 16:
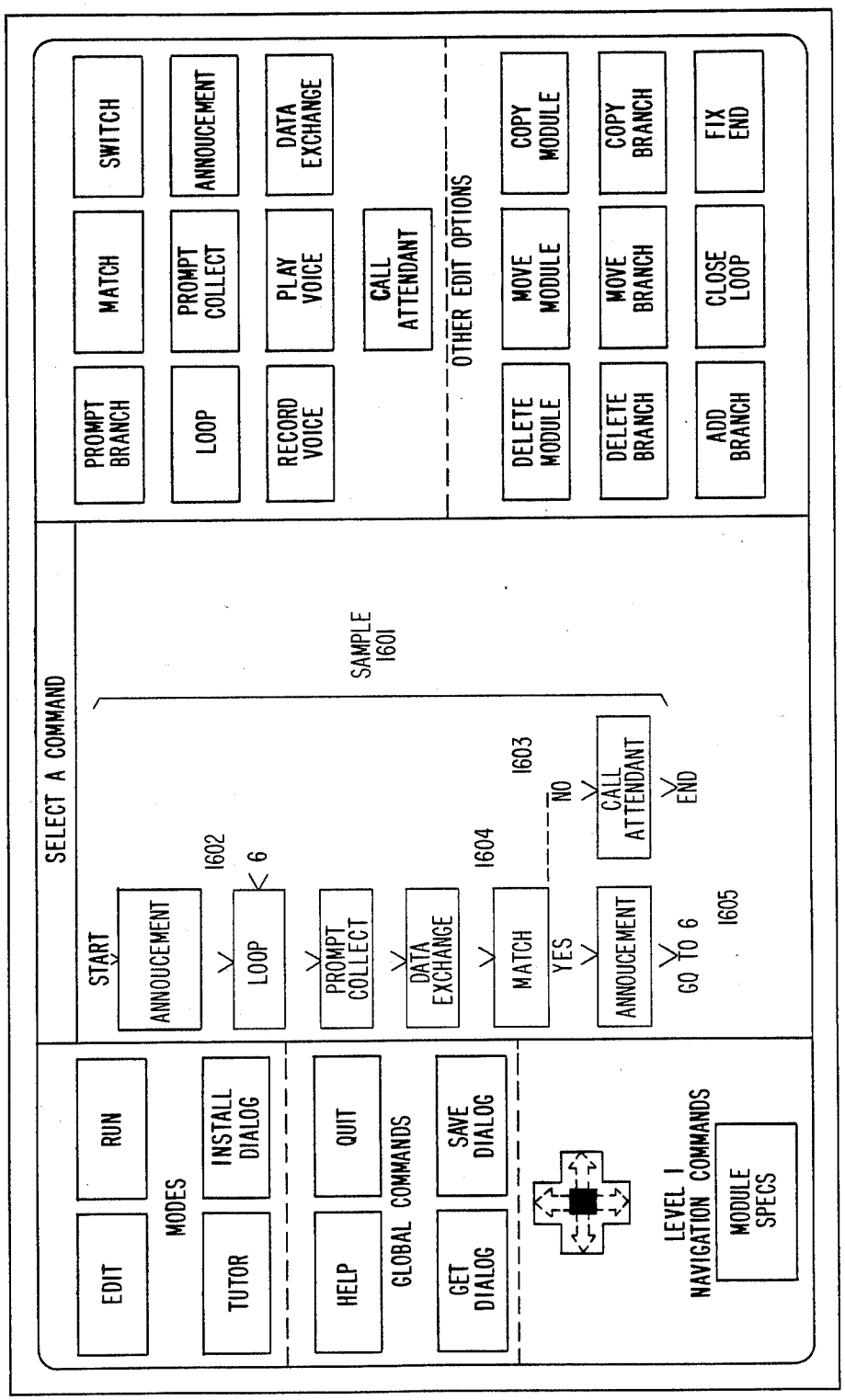
FIG. 16 shows the basic screen display for Level 1 of a simple dialog.

When the producer selects the "Edit Mode" (1302), the DPS displays the present dialog in the tree window FIG. 16 (1603) and the producer can then manipulate the tree structure with the "edit or insert" commands.

When the producer selects the "Run Mode" (1304), the DPS interprets the present dialog (1305). This interpreter function allows the producer to test the logic of his dialog interactively. The interpreter flags any syntactical errors made while the producer created the dialog and displays an appropriate error message. The interpreter can be used on partial dialogs; therefore, the producer can determine the integrity of sections of the application separately.

When the producer selects the "Tutor Mode" (1306), the DPS interactively guides the producer through the steps of building a dialog (1307). When the producer selects the "Install Mode" (1308), the DPS downloads the current dialog, compiles it, and installs it as a running service.

TUTOR MODE

The DPS provides an initial tutorial instruction session for the inexperienced producer. A sample application (e.g., see 1601 of FIG. 16) is described to the producer, who is then guided through the steps required for the creation of such an application. Feedback is provided regarding the producer's actions in creating the dialog and experience is provided in manipulating the interaction modules, using the editing functions, and specifying the level 2 parameters (shown as 1501–1504 in FIG. 15).

EDIT MODE

Figure 2:
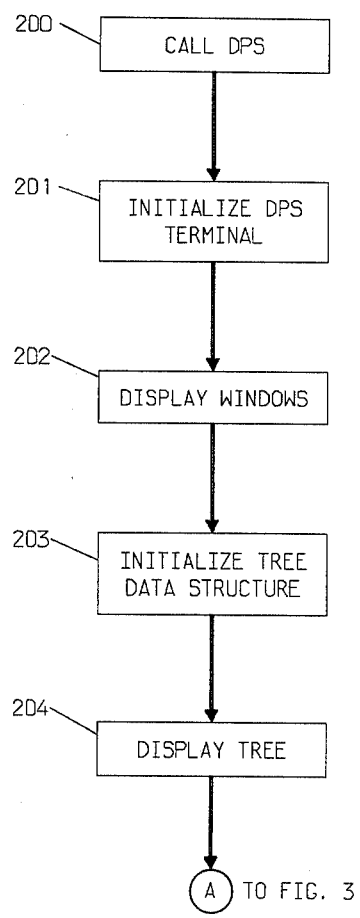
FIGS. 2, 3 and 4 show the basic control structure for the Dialog Production System.

The operation of the DPS Edit Mode can be described with joint reference to FIGS. 1 and 2. When the DPS is first called (200) by a dialog terminal (e.g., 105 of FIG. 1) it is initialized (201) for that specific type of terminal. The system displays several windows needed for the description of the application program (202).

These include Mode, Global, Insert, Edit Command, Navigation, Form and File windows as depicted in FIG. 14. After the windows have been displayed, the program initializes the data structure (203) and displays a basic tree on the screen (204). The basic tree is illustrated by 1430 of FIG. 14. At this point, the DPS program waits for terminal input (300) from the dialog producer at dialog terminal 105.

The producer provides input to DPS by selecting the particular options that are provided in the windows depicted in FIG. 14. The producer can select among various input modes by selecting the edit 1411, run 1412, tutor 1413 or install dialog 1414 mode from the Mode window in the upper left hand corner of FIG. 14. Selection of one of these modes (301) results in processing of that input from the mode window (302) as shown by the flow chart of FIG. 13.

Certain user commands are global commands because they are available to the user throughout the entire application session. These commands are help 1415, quit 1416, get dialog 1417 and save dialog 1418; they are shown in the Global window on the left hand side of FIG. 14 below th Mode window. When one of these global commands is selected (303), the dialog production system processes the input from this global window (304) as depicted by the steps shown in FIG. 11. The options for the insert window (depicted in the upper right hand side of FIG. 14) are: prompt and branch 1402, match 1403, switch 1401, loop 1404, prompt and collect 1405, announcement 1407, record voice 1408, play voice 1409, data exchange 1410 and call attendant 1406, these are the interaction modules which the producer manipulates. When one of these Insert window options is selected (305) the appropriate processing is conducted (306) as shown by the flow chart of FIG. 5.

Figure 6:
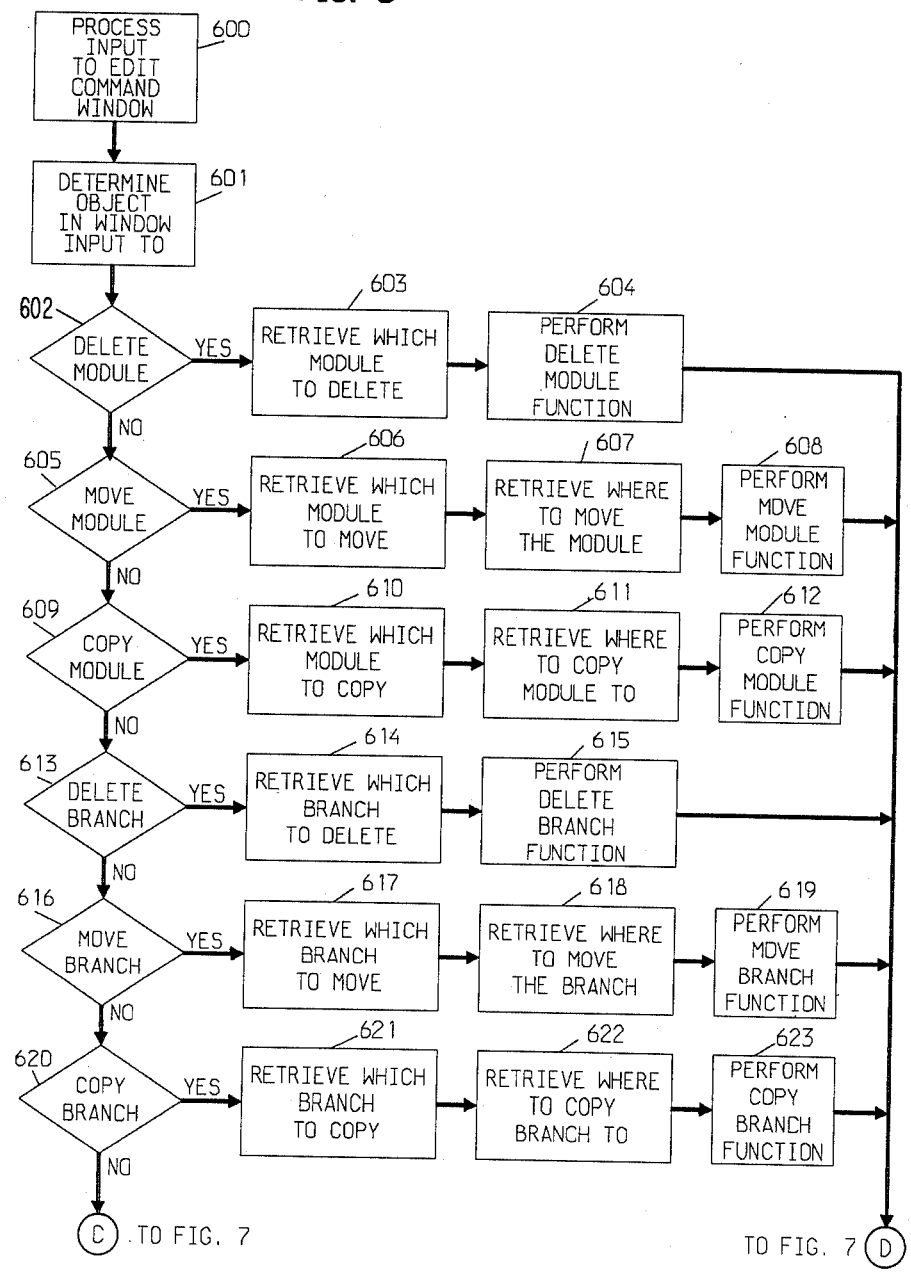
FIGS. 6 and 7 show the control processing flow for editing the dialog flowchart.

The Edit window depicted in the lower right hand side of FIG. 14 allows the producer to delete modules 1419, move modules 1420, copy modules 1421, delete branches 1422, move branches 1423, copy branches 1424, add branches 1425, close loops 1426, or fix the end 1427 of the program. When one of these alternatives of the Edit window is selected (307) appropriate branching takes place (308), as described by the flow chart shown in FIG. 6.

Figure 8:
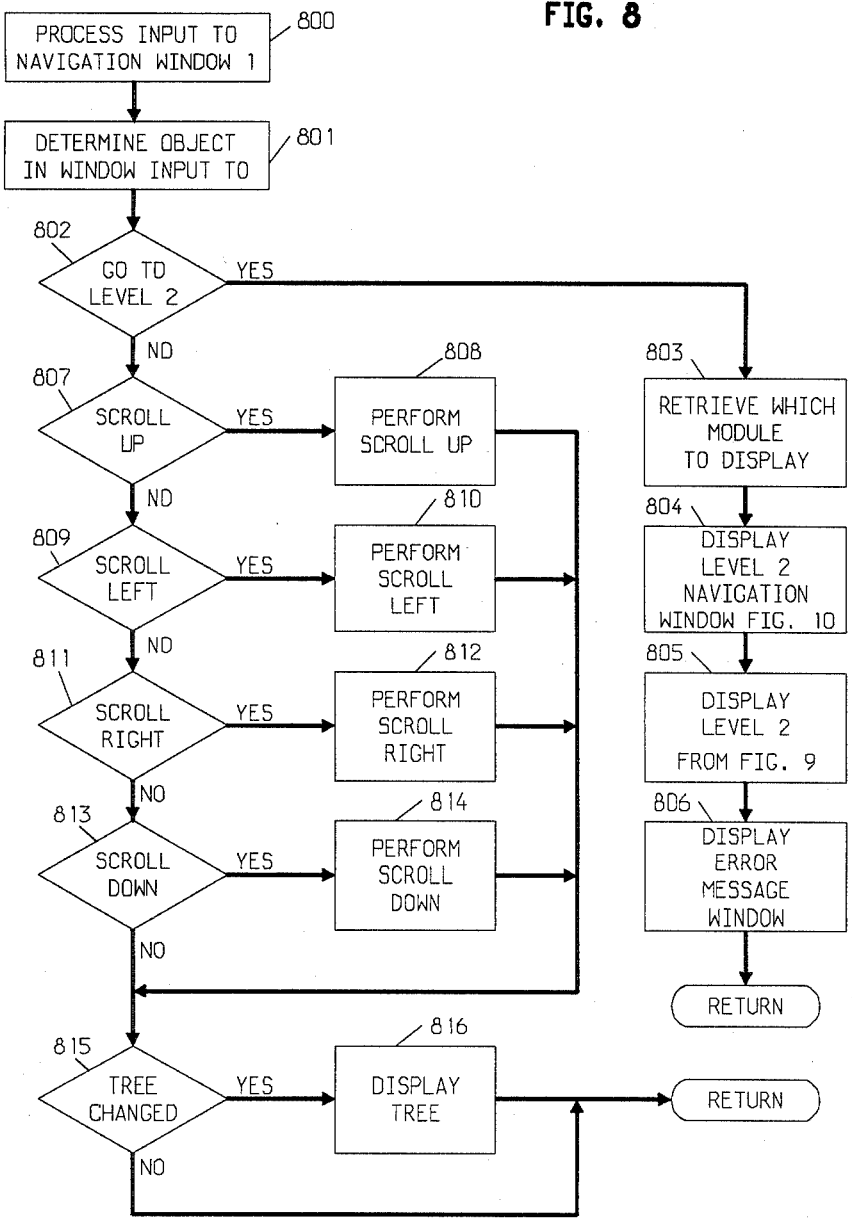
FIG. 8 shows the control processing flow for navigating and scrolling in Level 1.
Figure 10:
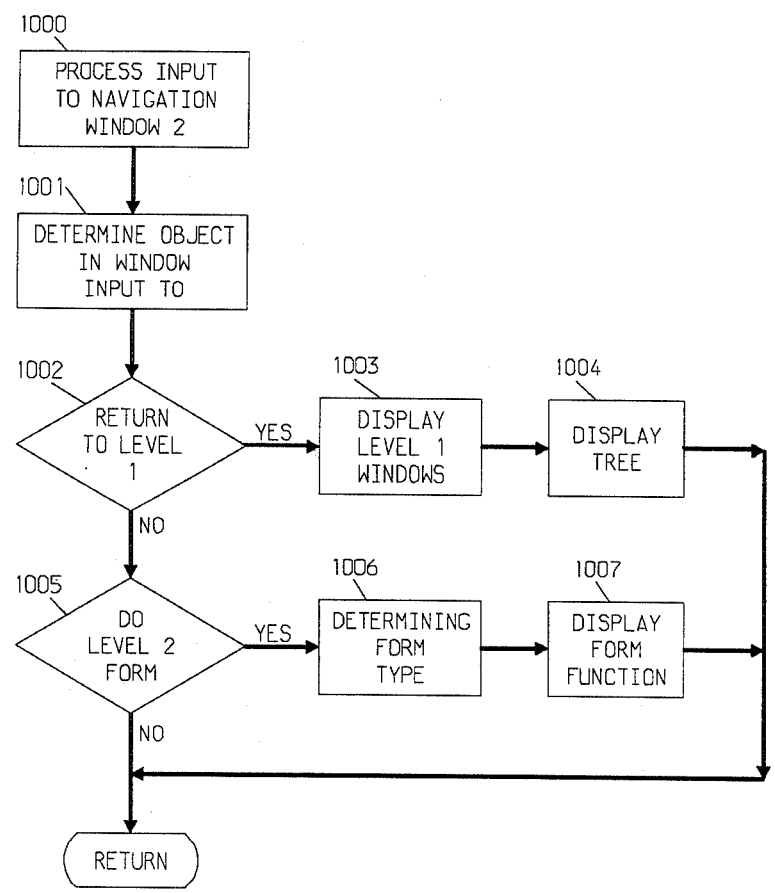
FIG. 10 shows the control processing flow for Level 2 navigation and for displaying Level 2 forms.

The navigation window commands are depicted in the lower left hand side of FIG. 14. This window includes a navigation block 1428 and a module specification block 1429. If the producer selects a direction to navigate (400), during the level 1 display shown in FIG. 14, the appropriate processing for this direction is done (401) as illustrated by the flow chart of FIG. 8. Thus, for example, if the producer selects the module specification block 1429, the (Level I command) producer is prompted for the interaction module (e.g., 1405) which the producer wishes to specify. The DPS processes these inputs in steps 800, 801, 802 and 803 of FIG. 8. FIG. 15 illustratively shows the level 2 window that is displayed when the prompt and collect module (1405) is selected (i.e., 804, 805 of FIG. 8). Note, the Navigate level 2 window Mode can also be selected during steps 402, 403 in which case it would be processed as illustrated by the flow chart shown in FIG. 10. The level 2 navigation commands which include the demand form (1501), control form (1502), error form (1503) and level 1 (1504) are depicted in the lower left hand corner of FIG. 15. The DPS processes the window 2 input in steps 1000, 1001 as shown in FIG. 10. The producer then selects to return to the level 1 display shown in FIG. 14 (i.e., step 1002) or selects which form to provide information (step 1005).

When FIG. 15 is displayed to the producer, the producer may provide information (404) on various parameters to the DPS by filling out the form depicted in the center of FIG. 15. This form information is typed into dialog terminal 105 and is processed as shown in (step 405).

After the level 2 modules have been parameterized, the producer would select "go to level 1" in the lower left hand corner of the screen FIG. 15. As illustrated by 1002 of FIG. 10, this action causes DPS to return to the display shown in FIG. 14. If the producer wishes to suspend the design session at any time, he may press the "save dialog" location 1418 in the Global command window. At this point, the producer is prompted by DPS for a filename or file specification to identify the application program and to store the various dialog created. In subsequent sessions, if the producer wishes to alter, edit or elaborate on the application program previously created he can press "get dialog", 1417, specify the filename for the existing application, and resume the design of the dialog from where it was left off.

INSERT MODE

A producer specifies the logical sequential flow chart of an application by selecting interaction modules from the Insertion window (steps 305, 306 and FIG. 5) and positioning them in the tree window depicted in the center of FIGS. 14 and 16. The selection of specific interaction modules, as well as their position relative to other interaction modules, completely specifies the logic interconnection of the modules of designed application program.

Figure 5:
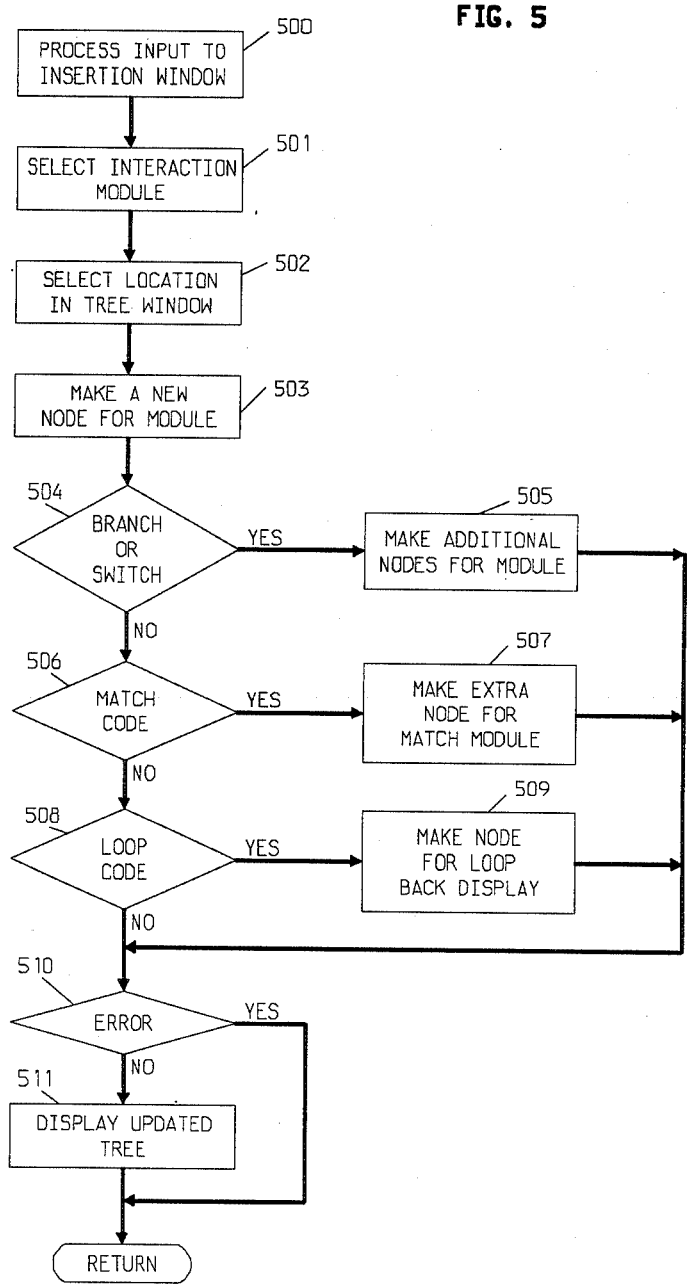
FIG. 5 shows the control processing flow for inserting modules into the dialog flowchart.

FIG. 5 depicts the process underlying the development of an application program logic using the Interaction modules in the insertion window. Internally, the dialog production system (DPS) describes this logic in the tree-data structure which was previously initialized (step 203 of FIG. 2). The producer selects (step 501 of FIG. 5) an appropriate module from the Input window depicted in the upper right hand corner of FIG. 14, and positions it (step 502) in the correct location in the tree window located in the center of FIG. 14. The DPS alters the tree data structure (e.g., see 1601 of FIG. 16) by inserting this function into the existing application logic. The DPS makes a node in this tree structure (e.g., see 1602 of FIG. 16) which represents the new change in logic (step 503). A node index is incremented specifying the logical number of the function. The tree structure is then given the type of node which the producer has suggested. (Type here means a switch or branch, a match code, a loop code, or any of the other interaction modules.) Depending on the type of node defined by the producer, the DPS adjusts the node's child and parent node--count. The DPS then sets a series of node pointers to the appropriate level 2 forms for the interaction module selected by the producer.

If the selected interaction module is a branch or switch type (504), additional nodes representing its' branches are made (505).

If the selected module is a match type (506), an extra node is made for it representing the branch to take if an unsuccessful match occurs (507). This is illustrated by 1603 of FIG. 16.

If the selected module is a loop type (508), the DPS makes additional nodes for displaying the loop top and loop bottom, these additional nodes are also used for loop back processing within the DPS dialog. This is illustrated by 1602 and 1605 of FIG. 16.

If any errors occurred during the insert process (510) the tree structure is not changed; therefore, the display would remain the same. Otherwise, the updated tree would be displayed (511) by DPS.

EDIT COMMAND FUNCTIONS

Figure 7:
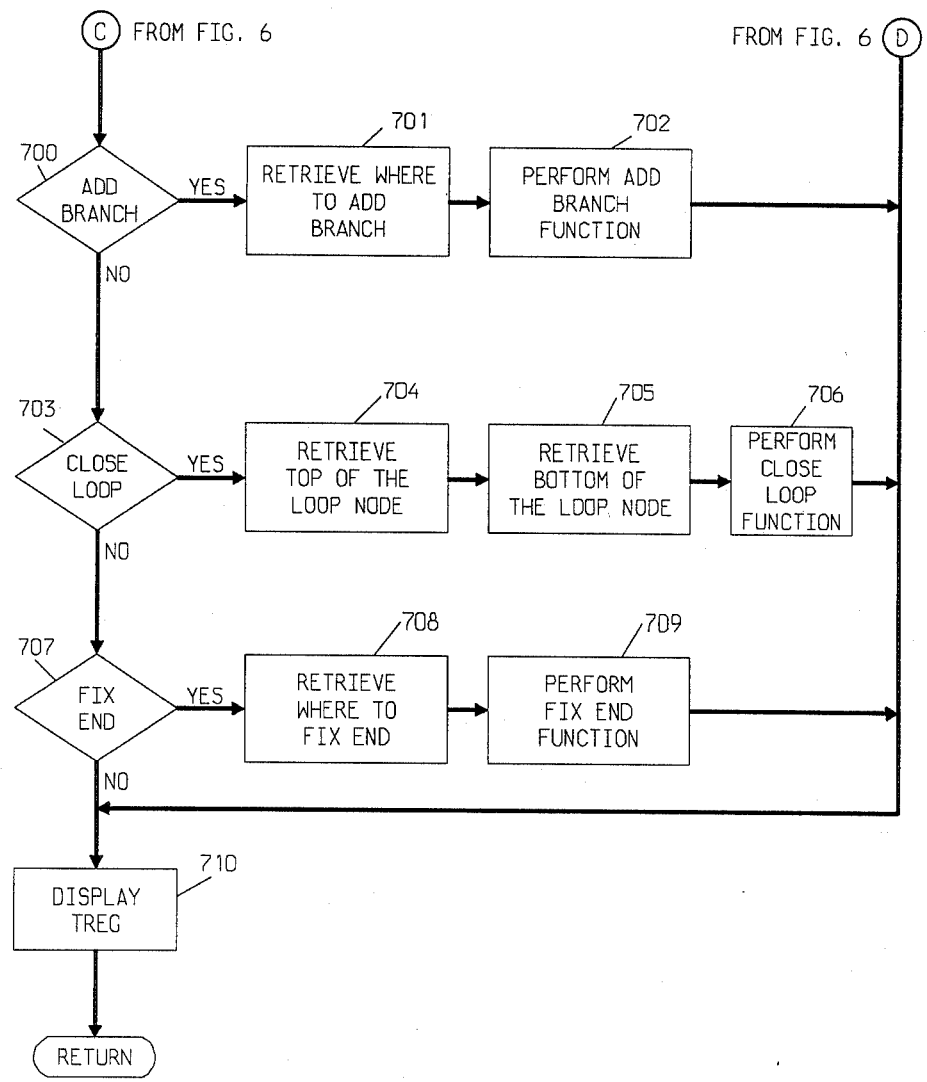

The DPS allows the producer to alter an existing application or alter a partially completed application by editing his prior work. This editing process is described with reference to the flow charts of FIGS. 6 and 7.

In the DPS, editing among the dialog flowchart (application programs) is done by selecting commands from the Edit command window depicted in the lower right hand corner of FIGS. 14 and 16.

To delete a module, the producer selects "delete module" (602) in the Edit window, and indicates which of the modules in the tree window should be deleted (603). The DPS determines which module existed at that position in the logical tree. Based on the type of module being deleted, the DPS adjusts the parent and child pointers, and removes the pointers to the appropriate level 2 specifications (604). The entire tree structure is readjusted for redisplay, and the new logical tree is displayed (710) in the center of FIG. 16. The DPS is arranged so as not to allow the producer to make an error which would render the logical structure of the application invalid. If the producer attempts to delete a module which has more than one output branch (e.g., see 1604 of FIG. 16), DPS provides an error message to the producer, and does not make the deletion.

If the producer selects the "move module" editing option (605), the producer must indicate which module is to be moved (606) and specify where in te logical organization of the application program the module should be moved (607). The DPS inserts the module at the specified location, deletes the module from the previous location, rearranges the pointers among the remaining modules (608) and redisplays the edited tree (710).

If the producer selects the "copy module" editing function (609), he then specifies the module to be copied (610), and where in the logical structure of the application to copy it to (611). The module is inserted at this point in the application. The logical tree, and the pointers between the copied module its parents, its children, and its level 2 specifications are readjusted (612). The new tree structure is used to recalculate the display and a new display is presented in the tree window (710).

If the producer selects the "delete branch" editing function (613), he then specifies which branch to delete (614). The DPS determines the parent of the branch and whether it is logically correct to delete the branch. If the DPS determines a proper delete selection, the tree structure is updated and the branch is replaced with an empty node (615). The updated structure is then displayed (710).

If the producer selects the "move branch" editing option (616), he must then specify the branch to be moved (617) and where in the logical tree to move the selected branch (618). The DPS determines if the selected branch is valid and if the selected destination for the branch is valid. If the move is valid, the branch and all of its child nodes are moved to the selected location (619). An invalid move would consist of trying to move a branch onto a module which does not contain branching. After the move is complete, the updated tree structure is displayed (710).

If the producer selects the "copy branch" editing option (620), he then specifies which branch to copy (621) and where to copy the selected branch (622). As with "move branch" the DPS determines if the copy is logically valid. If it is valid, the branch node and all of its children are copied to the new location (623). The updated tree structure is then displayed (710).

If the producer selects the "add branch" editing option (700), he must then select where the branchis to be added (701). The DPS determines if it is logically correct to add a branch to the selected location, if so, an empty branch is added (702). An example of an invalid location would be trying to add a branch to a module which does not allow branches (i.e., data exchange). After the tree structure is updated, it is displayed (710).

If the producer wishes to select the "close loop" function (703), the DPS requires that the producer specify the top of the loop (704) and the bottom of the loop (705), it then readjusts the logical tree to specify the loop structure (706) and the updated tree is displayed (710).

When an entire branch of the application has been completed, the producer indicates the completion by using the "fixed end" editing command (707). The producer selects the "fix end command" and attaches it to a branch as a terminator for the dialog branch (708, 709).

GLOBAL WINDOW COMMANDS

Figure 11:
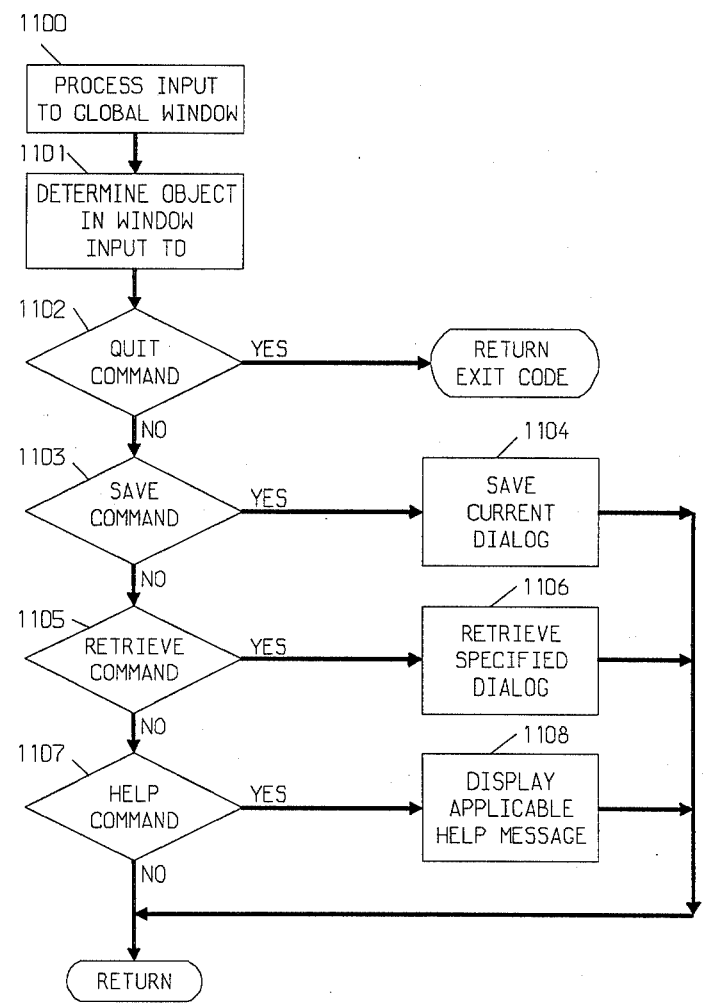
FIG. 11 shows the control processing flow for global commands (HELP, SAVE DIALOG, RETRIEVE DIALOG, EXIT)
Figure 12:
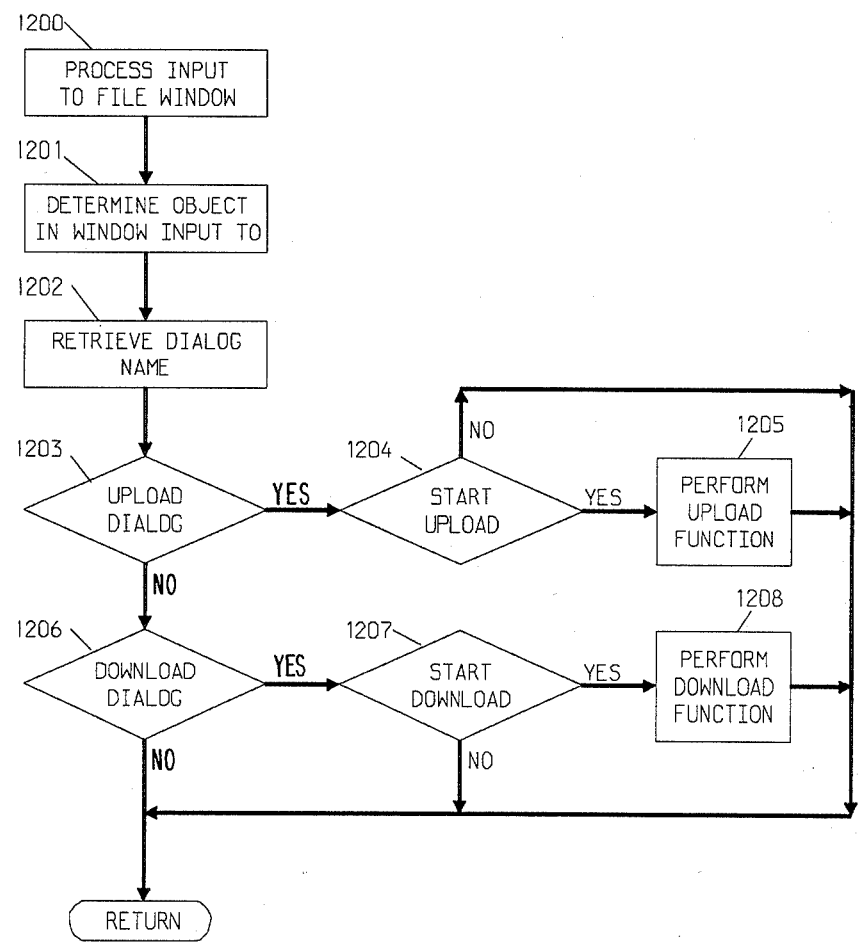
FIG. 12 shows the control processing flow for uploading and downloading a dialog.

The operation using the global window command is described with joint reference to FIGS. 11 and 12. The four commands "help", "quit", "get dialog" and "save dialog" are global and are accessed as illustrated in FIG. 11. They are displayed on the left-hand side of FIGS. 14, 15 and 16. These commands are available at any point in the producer's interaction with the DPS. With reference to FIG. 11, if the producer requests help while in level 1 of the dialog production system (1107), he is prompted for the specific interaction module, function, or mode he wishes help for (1108). If the producer is in level 2 of dialog creation, he receives help specifically for the level 2 form currently on the screen (1108). Thus, "help" in the DPS is context specific. The "help" command may be implemented using well known diagnostic routines.

If the producer selects the "save current dialog" function (1103), a "pop-up" window (not illustrated) is displayed in the center of the screen (1104) and control is passed to the "pop-up" file window (1200). With reference to FIG. 12, the DPS determines which option in the "GLOBAL WINDOW" was selected (1201) in this case "save". The producer is prompted for a filename to store the dialog in (1202) and the DPS selects the download branch (1206). The producer then specifies whether to start the download (1207) and the data structure associated with the current application and all of the relevant form information are saved under a filename specified by the producer (1208).

If the producer specifies a "retrieve dialog" function (1105), the "pop-up" file window is displayed in the center of the screen (1106) and control is passed to the "pop-up" file window (1200). The DPS determines which option in the "GLOBAL WINDOW" was selected (1201), in this case "retrieve". The producer is then prompted for the name of the dialog to upload (1202) and the DPS selects the "upload" branch (1203).

The producer specifies whether to start the upload (1204) and the dialog and all of its associated data structures are uploaded (1205). DPS gets the file specified and uses the logical structure and level 2 parameter values to recreate the previously designed application.

Figure 4:
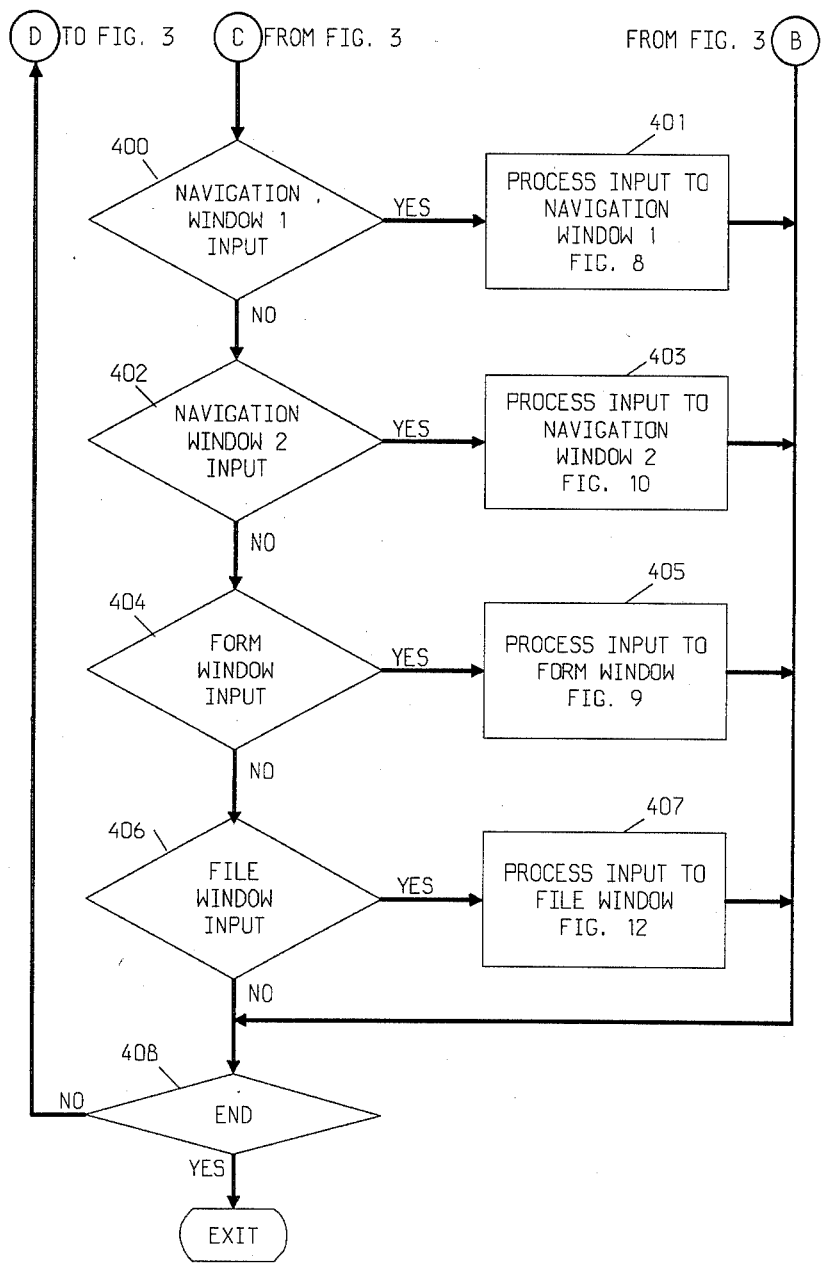

If the producer specifies the "quit command" (1102), the DPS terminal is reset to the original characteristics and the program exits (1209) and control returned to decision block 408 of FIG. 4.

NAVIGATION AND SCROLLING

The navigation and scrolling functions depicted by 1428 in the lower left hand corner of FIG. 14, allow the producer two kinds of control over the display of the application. This function is described with joint reference to FIGS. 8, 9 and 10.

First, the scrolling mode allows the producer to control the display of the logical tree underlying the application. Many applications may be large and complicated; too large, too complicated, possessing too many interaction modules for the entire application to be displayed in the center part of the screen of FIG. 15 or 16. The scroll function allows the producer to select which portion of the logical structure should be displayed at any one time. Conceptually, this functions as if the logical tree describing the application were hidden behind a smaller size window. The scrolling commands move that window over the logical tree displaying portions of it according to the user's commands (807, 809, 811, 813). Secondly, the navigation mode function allows the producer to navigate through different levels of the application (802). The producer specifies the level 1 logic of the application by arranging the interaction modules in a spatial relationship. The navigation mode allows the producer to select the second level for each interaction module. At the second level of the interaction module, a form is displayed to the producer which allows the user to specify definable parameters for the application. A level 2 form display is depicted in FIG. 15.

Figure 9:
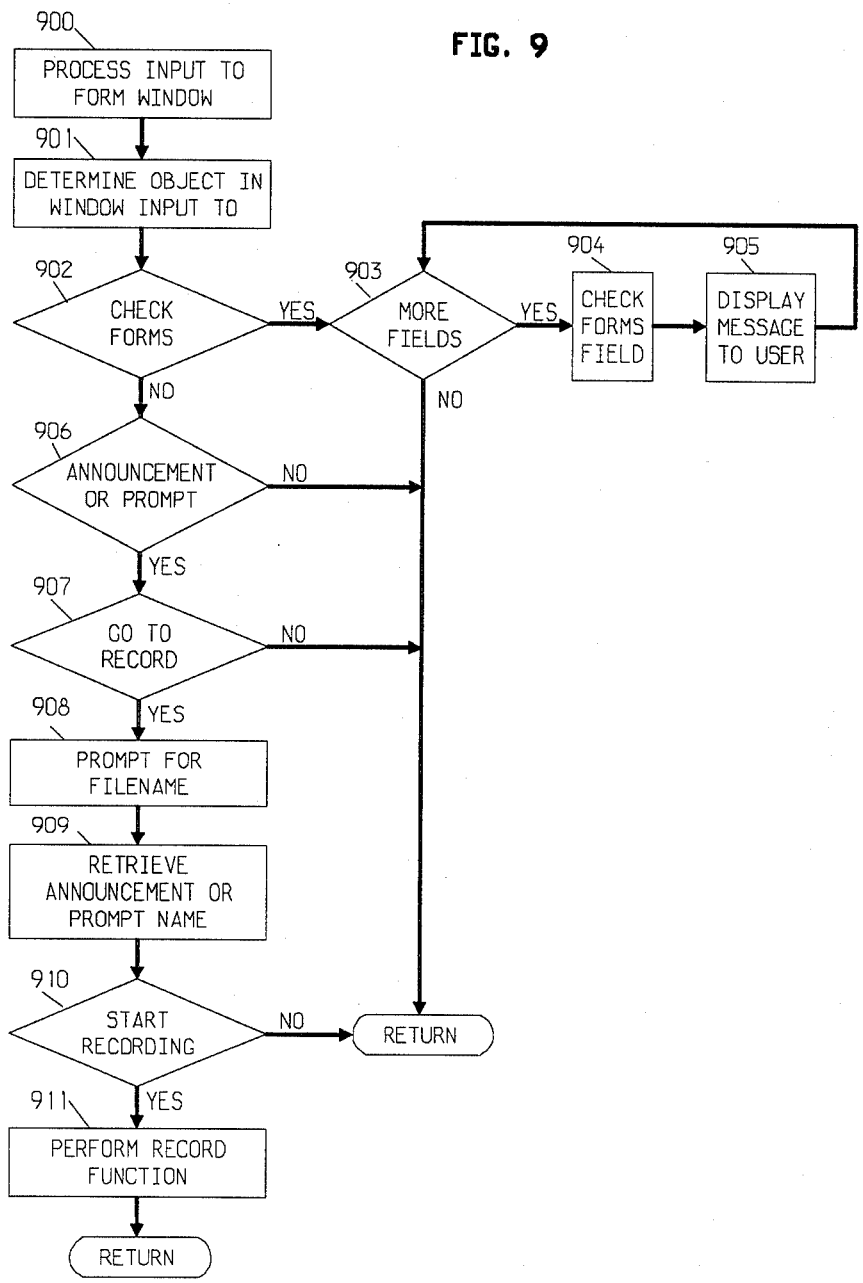
FIG. 9 shows the control processing flow for entering and checking Level 2 form parameters.

If the user wishes to set the level 2 parameters, it is done by filling in the forms depicted in FIG. 15 for each parameter. For example, in the center of FIG. 15 is the form utilized with the prompt and collect module. The operation of the form subroutine is illustrated in FIG. 9 and described below jointly with FIG. 10.

The producer selects (802) the "module specification" function in the navigation window and then selects the specific interaction module in the tree which he wishes to specify (803). The DPS determines which module this is and displays the appropriate forms for it (805). After specifying the parameters on level 2 the producer may select the "check forms" function (902) depicted in the lower portion in FIG. 15. The DPS checks the logical consistency and rationality of the parameters selected by the producer (904). If the parameters selected by the producer are inappropriate for the application, an error message is displayed (905). If no more fields are required 903 control is returned to FIG. 8.

Depending upon the type of interaction module selected, there may be more than one form which must be filled out. If more than one form is necessary the producer specifies which form he wishes (1005). The DPS determines the type of interaction module and the type of form selected (1006) and displays the appropriate form structure (1007) shown in FIG. 15.

Certain types of information specified in the control form and error form are provided as default values which the producer can change. For example, values of timeouts, and values of error thresholds are given default values which the producer can then change. Other level 2 information is demanded of the producer. For example, the module that plays an announcement or prompt requires that the producer specify the text of the announcement or prompt to be played at that particular point.

For announcement or prompt modules (906), a third level of application specification is provided. The DPS asks the user if an announcement or prompt is to be recorded (907) and prompts the producer for a label for the prompt (908) (909). At level 3, the DPS waits for the user to specify when to start the recording (910) and the producer codes the actual announcement or prompt (911).

Run Mode

The producer interface of the DPS uses a flow chart and menu based procedure to enable the producer to describe the important aspects of a generated application program. The run mode of DPS translates this producer description into a formal set of specifications for a service. At its most basic level the DPS run mode uses a collection of arguments or parameters to modify run-time routines. Run Mode is used to test or preview an application before installing it as a service. An application can be previewed in Run Mode using a text-to-speech conversion facility to review planned announcements and prompts.

The flow chart of interaction modules which comprise the generated application program is represented as a linked list (directed graph). Each node of the linked list contains both information about the interaction module associated with the node and information about the successor nodes to which the node is connected. Each individual node contains indices to its child nodes. These indices constitute the interconnection between each interaction module. Each node also contains a type description. Therefore, when the dialog is run DPS increments an index pointer and executes each node successively based on the index value. The type of routine executed is based on the "node type". Thus, the flow chart is represented as a list of node descriptions with each containing information about how the nodes are interconnected.

The Level II description of each interaction module has several arguments which are organized into forms. The demand form is used to collect those arguments that require specification in order to complete a service. The options form collects any modifications of standard, default parameters of the interaction module. Finally, the error form is used to set those arguments which control the manner in which an interaction module processes errors. The arguments in these three forms, together with the linkage information, comprise a node description.

Table 1, shown in FIG. 24, provides a structural representation of each node description. The first row 2401 contains the basic information about the interaction module and its linkage to other nodes. Next, for each form there is a row describing the form, followed by several rows containing the argument values associated therewith.

Interaction module represents nodes in the dialog which are connected through a list of indices. Each node (i.e., 2400) specification, FIG. 24, contains a number of indices which point to their respective children (i.e., CHLDCT-2401). The number of these indices a module contains is based upon its code (2402). For example, a Switch interaction module can have up to six child nodes (i.e., 2403), therefore it would have six child indices. On the other hand, the Announcement module contains only one child index because there is only one possible exit point from a module of that type. These child indices are stored within the node specification data structure during the EDIT mode of DPS. Each node can contain up to three form types (e.g., 2404) each form containing a number of arguments (ARG-1-ARGN, 2405) and a number (LINECT) which specifies the space needed to store the arguments. One illustrative form Prompt and Collect module is shown in FIG. 15 which contains three arguments 1505, 1506, 1507 each requiring one or more lines of space of the total LINECT.

In table 1, the abbreviations are described below:

Node#—Unique number identifying the node.

Code—Number identifying the interaction module type for the node.

Formct—Number of forms used by the node.

Chldct—Number of child nodes, i.e., the number of node which branch from this particular node.

Child1 through Childx—Number identifying the node index for each of the children. These indices represent the links between modules.

Form—Number identifying the type of form whose arguments follow.

Argct—Number of arguments (ARG1-ARGN) for the form.

Linect—Number of lines required to contain the form's arguments.

ARG1 through ARGN—The value of the ordered arguments within a form. Note, the Level 2 parameters are stored as the actual values in the argument locations.

For example, the arguments can be numeric or a character string. These types do not contain white space or any special characters.

Word arguments can contain wild card characters. Text strings and prompts are strings of multiple words. Text strings can also contain wild-card characters (a character which can be any symbol) both of the single character kind, '?', and of the word kind, '*'. Finally, both text strings and prompts can contain variable substitutions. If the word should be interpreted as a variable name, the string contained within this variable should be substituted into the original string upon evaluation, portions of the argument are delimited by curley braces, i.e., '{' and '}'. The basic difference between text strings and prompts is that prompts are used to construct voice segments to be issued to the caller.

Formatted text arguments are special purpose languages which characterize complex options. One describes the conditions under which a branch will be followed, another describes the characteristics of valid input, and the third describes the anticipated format of a response string.

All intermodule communication is accomplished via variables. These variables are assigned a name upon their first use and are subsequently accessed by this name. The variables are global, and can be embedded within argument strings by using variable substitution.

Figure 17:
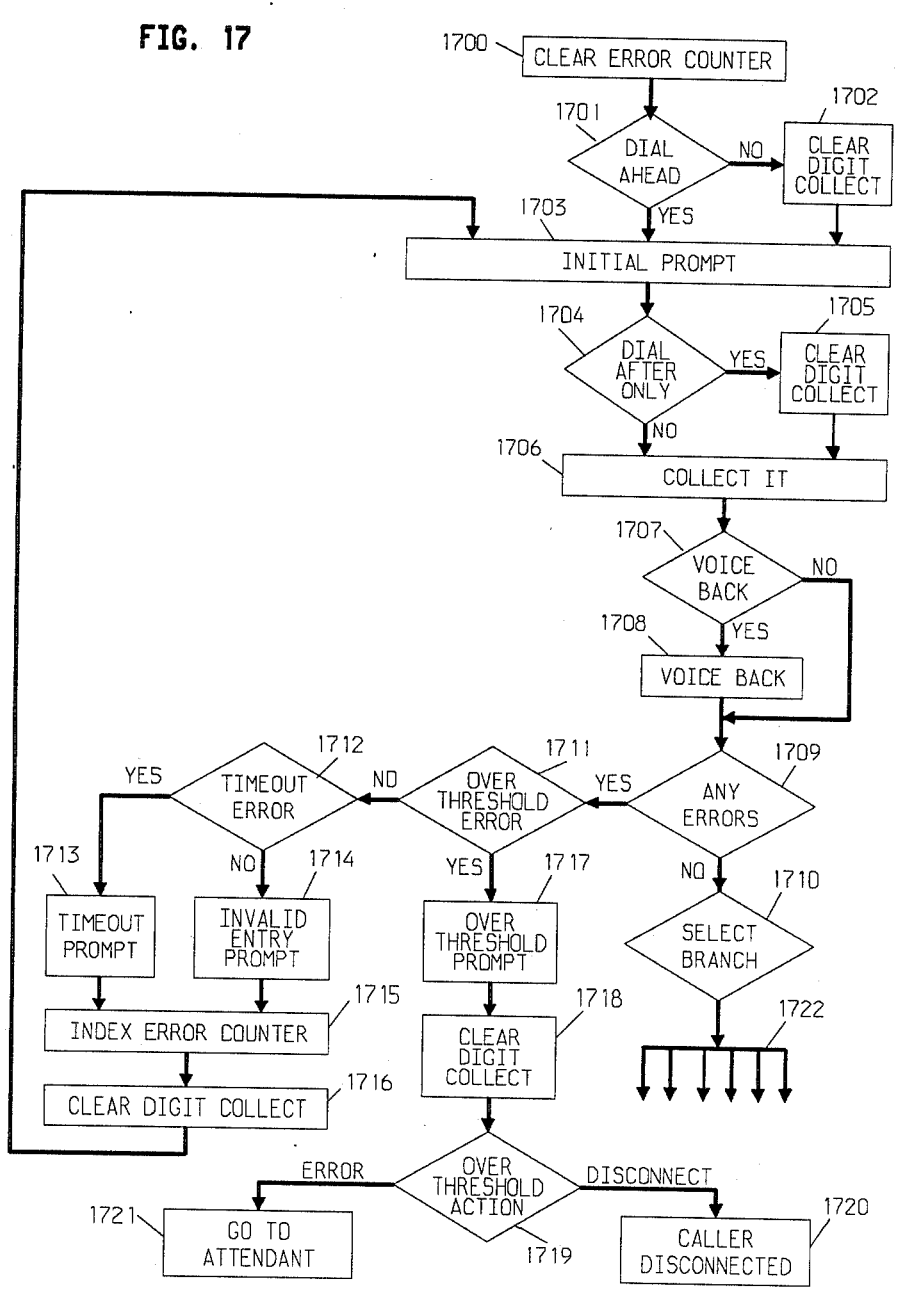
FIG. 17 shows the run-time flow of the Prompt and Branch Interaction Module.

FIGS. 18 through 23 describe the run-time flow of the various interaction modules 1401-1410 shown in the upper right hand corner of FIG. 14. FIG. 17 presents the run-time flow for the Prompt-and-Branch module. The activity begins with a set of initialization actions (1700) such as clear error counter. If the dialog producer has indicated that input occurring prior to entering the module is irrelevant (e.g., no dial-ahead), the digit collector (i.e., TT receiver 112 of FIG. 1) is cleared (1702). An initial prompt (from voice retrieve unit 115 of FIG. 1), such as "Please enter 1 to continue or 2 to quit." is issued to the caller (1703).

At step 1706, the basic digit collection takes place. If the dialog producer has indicated that digits collected prior to the onset of Prompt and Collect are irrelevant the digit collector is cleared (1705). The module reads the digits from the digit collector (i.e., 112) via the TT Collect procedure. This procedure checks timeout conditions and monitors for special-purpose escape sequences (e.g., caller-initiated erasure of input or termination character). Once the digits have been passed to the module they may be voiced-back to the caller (1708). At the producer's option, the output may be interruptible by the end-user.

The module checks for errors and takes the appropriate actions (1709). If there are no errors, then the requested branch (1710) can be taken based on the caller's input Each of the branches (1722) represent a separate producer specified interaction module to pass control to. Since the branches are specified by the producer, their type can vary from dialog to dialog. If there is an error, 1709, and an error threshold has been exceeded, 1711, then a sequence of actions is initiated.

If the error threshold is exceeded 1711 then a non-interruptible prompt (1717) indicating the problem is played to the caller. Next, the digit collector (i.e., 112) is cleared (1718) to ensure that subsequent processing cannot be affected by digits collected prior to a known error. Then, either the caller is disconnected (1720) from the service or control is passed to an attendant (1721). Note, in step 1721 control can also be passed to an error routine which includes a series of interaction modules that had been established by the dialog producer to handle errors.

When a subthreshold error is encountered, (1711) it is determined whether a time-out error exists 1712. If due to a timeout condition (i.e., the caller's response was not rapid enough a non-interruptable time out prompt is issued 1713, the error counter is incremented *TT cleared). If the error was due to an invalid entry then an appropriate, non-interruptible prompt (1714) is issued, the error counter is indexed (1715), and the digit collector is cleared (1716). Finally, the normal flow of the module is resumed with the reissuance of the initial prompt.

For the Prompt-and-Branch module, the demand form contains the text of the initial prompt and the input value required for each branch. The input values form an ordered set with the order being parallel to the list of child nodes. The designation Error is assigned to the branch to be taken when the errors exceed a threshold.

The options form for the Prompt-and-Branch module deals mainly with dialing permission and output interruption. DIVA services must offer various levels of dialing permission to accommodate different levels of sophistication in the calling population.

The error form for the Prompt and Branch module contains the timeout prompt, the invalid entry prompt, the error threshold, the over threshold action (e.g., disconnect or branch), and the over threshold prompt.

The match module (not illustrated by a Figure) constructs two strings (a source and a target string), compares them, and branches depending whether they are the same. The demand form for the Match module requires the source string, the target string, and the branch to take upon a match. The Match module provides a rich capability for forming matches. Wild card characters are not permitted in the source string. The target string is expected to contain pre-established information that controls the match. This string can, however, contain embedded variables and wild card characters. Finally, the form permits the dialog producer to select which branch to take in the event of a match.

The operation of the loop module (not illustrated by a Figure) is described below. Until the loop threshold is exceeded the module simply indexes the loop counter and takes the normal loop exit. If the threshold is exceeded, a prompt is issued to the caller, the digit collector is cleared, the loop counter is cleared, and one of two actions is taken depending upon the specifications of the dialog producer. The demand form for the Loop module collects the loop threshold, the over threshold prompt, and the over threshold action (e.g., Disconnect or Branch).

The Switch module (not illustrated by a Figure) does not require interaction with the caller. It selects one of a number of branches by testing to determine whether a branch condition is true. Each of the branch conditions is evaluated in sequence with the first true condition causing the branch to be selected.

In the demand form for the Switch module, for each branch tested, one argument of formatted text is required. The text indicates a boolean combination of variable values that must be true for the branch to be taken. The variables are system variables such as the time-of-day and the day-of-the-week that are constrained to the set of values enumerated in the parenthetical list. Combinations of variables are then selected using the two operators. The DPS assures that at least one condition will be true by use of the "catch-all" condition, a default, which always evaluates to true.

Figure 18:
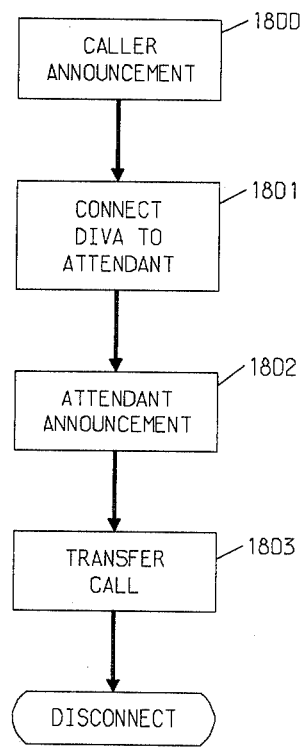
FIG. 18 shows the run-time flow of the Call Attendant Interaction module.

FIG. 18 depicts the run-time flow for the Call-Attendant module. An announcement is issued to the caller (1800). After a connection is made to the attendant (1801) an announcement is played to the attendant (1802). The call is transferred to the attendant (1803) and the connection to the DIVA application program is broken. The DPS accomplishes these actions by PBX signaling. The demand form for the Call-Attendant Module contains the caller announcement, the attendant's extension, and the attendant announcement.

Figure 19:
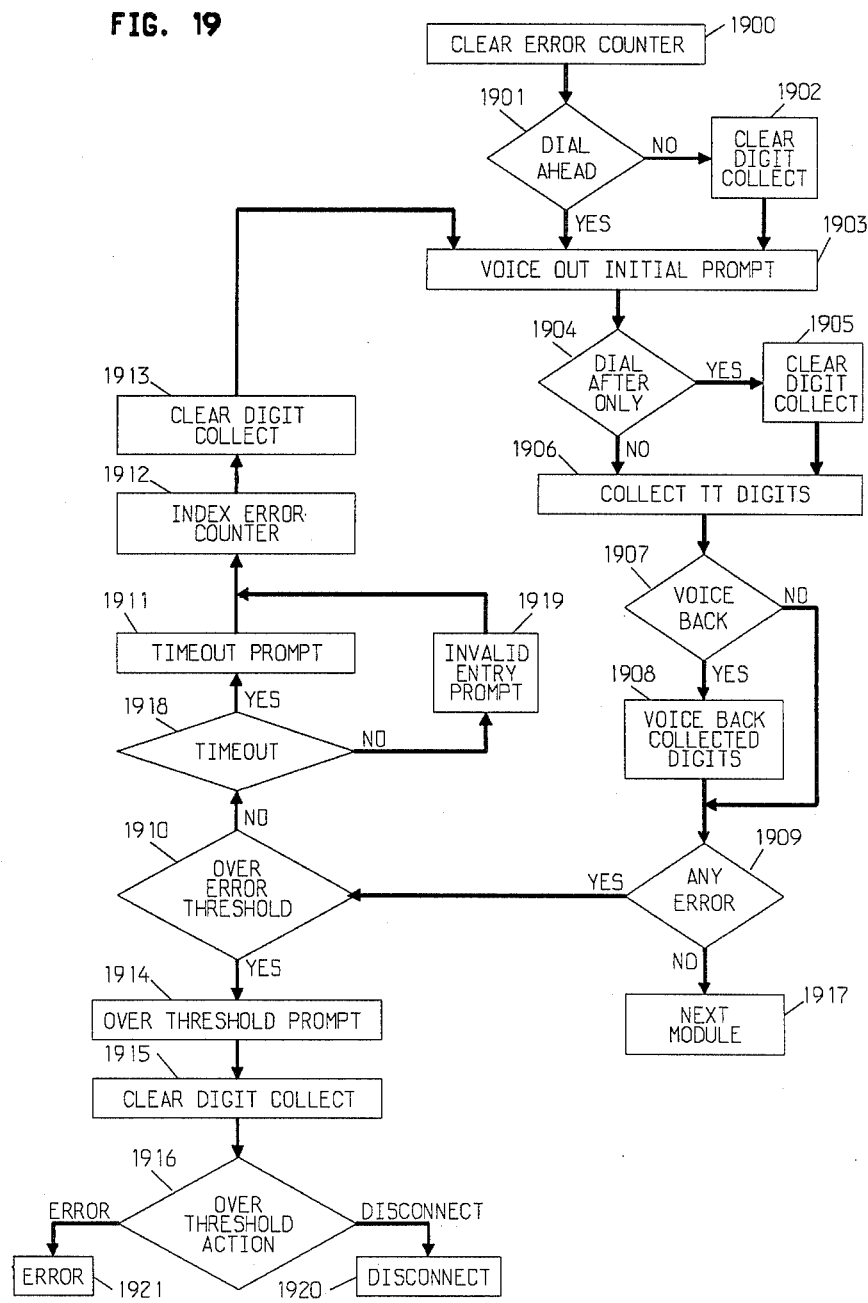
FIG. 19 shows the run-time flow of the Prompt and Collect Interaction module.

FIG. 19 depicts the run-time flow for the Prompt-and-Collect module. The operation of steps 1900 through 1907 are identical to steps 1700 to 1707 of FIG. 17. This module is similar to the Prompt-and-Branch module. At (1906), the basic digit collection takes place. If the dialog producer has indicated that digits collected prior to the onset of Prompt and Collect are irrelevant the digit collector is cleared (1902,1905). The Prompt-and-Collect module permits the caller to enter data, which is checked for validity (1909). If the data is valid, control is passed along to the next module (1917). If the data is not valid, i.e., an error, check error threshold (1910). If over-threshold follow steps 1914, 1915, 1916 and 1920 or 1921. If not over-threshold check if time out error 1918 exists. If yes, follow steps 1911, 1912 and 1913. If no, then invalid entry prompt 1919 and follow steps 1912 and 1913.

In the demand form for the Prompt-and-Collect module, it is necessary to specify the conditions when an input is considered valid, and the variable to which the collected data is to be placed.

The formatted text arguments include the type of input expected, and permissible values. Both unsigned integers, and strings are allowed. Wild card characters in the string specifications can be used to indicate a range of string values. The options form and error form for the Prompt-and-Collect module is the same as for the Prompt-and-Branch module.

Figure 20:
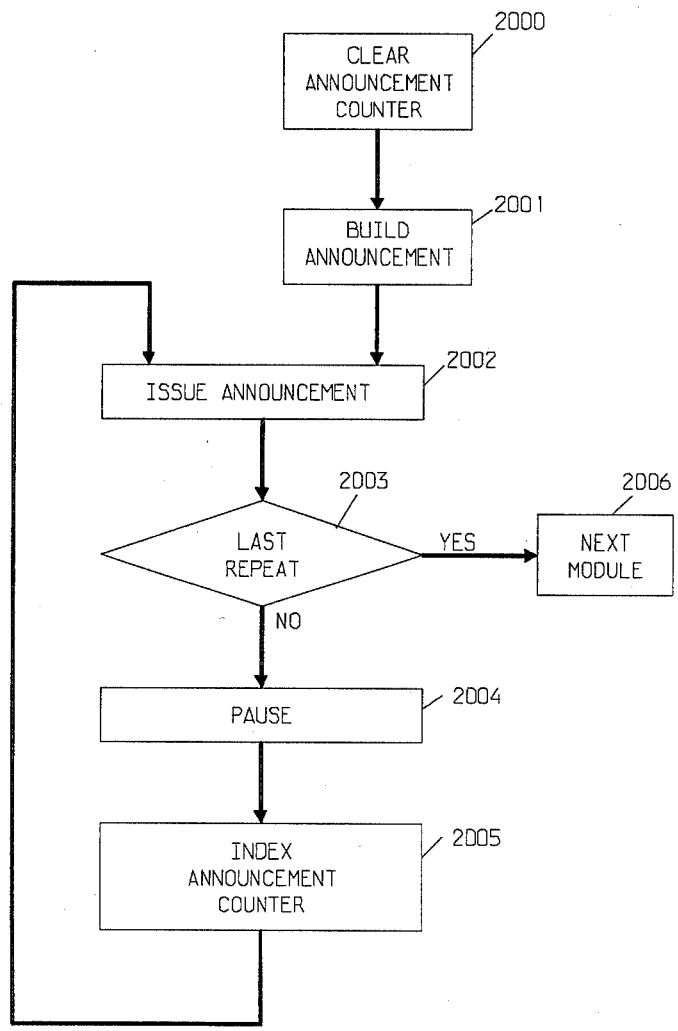
FIG. 20 shows the run-time flow of the Announcement Interaction module.

FIG. 20 depicts the run-time flow for the Play Announcement module. This module plays an announcement to the end-user (2002). The announcement counter is checked (2003), if the counter matches then the limit control is passed to the next producer specified interaction module (2006) (child node); otherwise, there is a short pause (2004) the announcement counter is incremented (2005) and the announcement is repeated (2002). The announcement can be designated as interruptible by the dialog producer. Any digits collected during or prior to the announcement cause the announcement to be aborted.

The demand form for the Announcement module contains the announcement specification and a declaration of the format of any variables. The announcement itself is indicated by a prompt argument that can contain variable specifications within the string. For each variable specification, a format is required. The four formats permit the contents of the variables to be interpreted as either a string, a dollar amount, a decimal integer, or an ordinal value (e.g., first, second, etc.).

Figure 21:
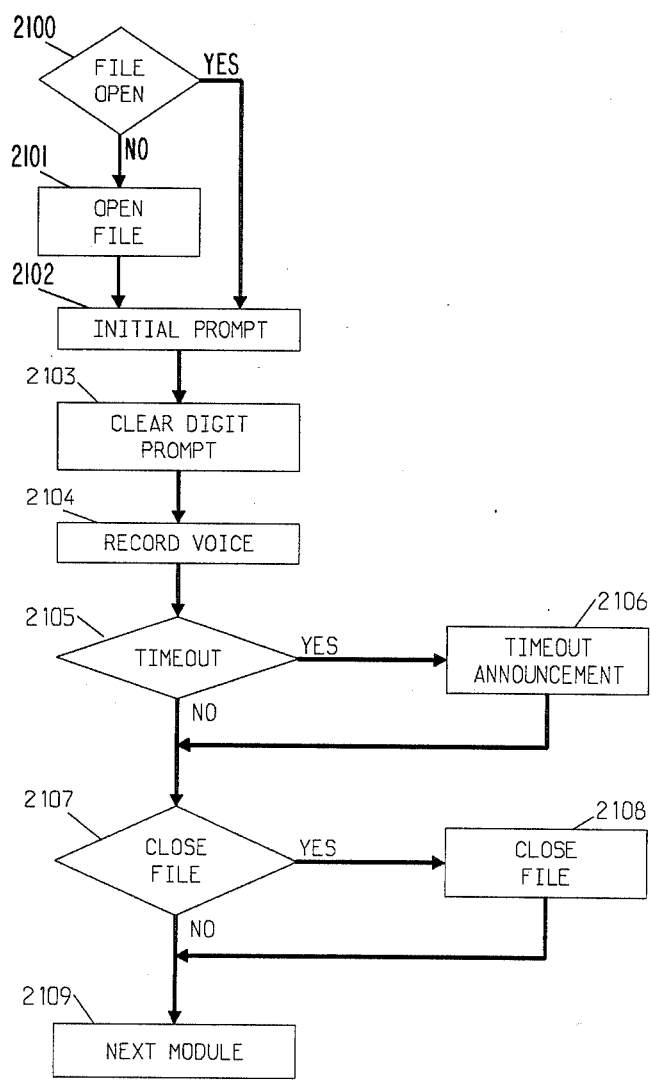
FIG. 21 shows the run-time flow of the Record Voice Interaction module.

FIG. 21 depicts the flow chart for the Record-Voice module. Because opening and closing voice files is a time consuming activity, and because DIVA services may wish to build voice forms by concatenating successive voice segments, the Record-Voice module leaves a voice file open after it is first accessed. Thus, upon entering the Record-Voice module, DPS determines whether the requested file is open and if not, opens it (2100,2101). The basic Record-Voice activities are to issue the initial prompt (2102), clear the digit collector (2103), and record the voice (2104). Recording can be ended by entering a digit. A voice recording will also be terminated if a specified time limit is exceeded; (2105) a prompt indicating the reason for halting is issued to the caller (2106). Thereafter the producer can close the file (2107, 2108) then go to next module (2109) or leave file open and go to next module (2107, 2109). The basic specifications for the demand form for the Record-Voice module are an initial prompt and a voice file.

The options form for the Record-Voice module (not shown) contains information such as the record position (Whole File, Append to Beginning, Append to End), the minimum message length, the silence indicating end, the stop record input, is pause compression enabled, should file be closed. The "record position" argument permits the dialog producer to indicate whether the new voice segment should replace the previous contents of the file, be appended to the beginning of the file, or be appended to the end of a file. When used in combination with the Play-Voice module this permits the construction of a rudimentary voice editing capability.

The stop record input argument is a string which indicates that the recording is completed. It permits the caller to signal the DIVA application that recording has finished. If the wild card character is provided as the string, then any input will terminate the voice recording.

Only a timeout condition is treated as an error for this module. The error form for the Record-Voice module has as arguments the time limit and the prompt that is issued when a timeout occurs.

Figure 22:
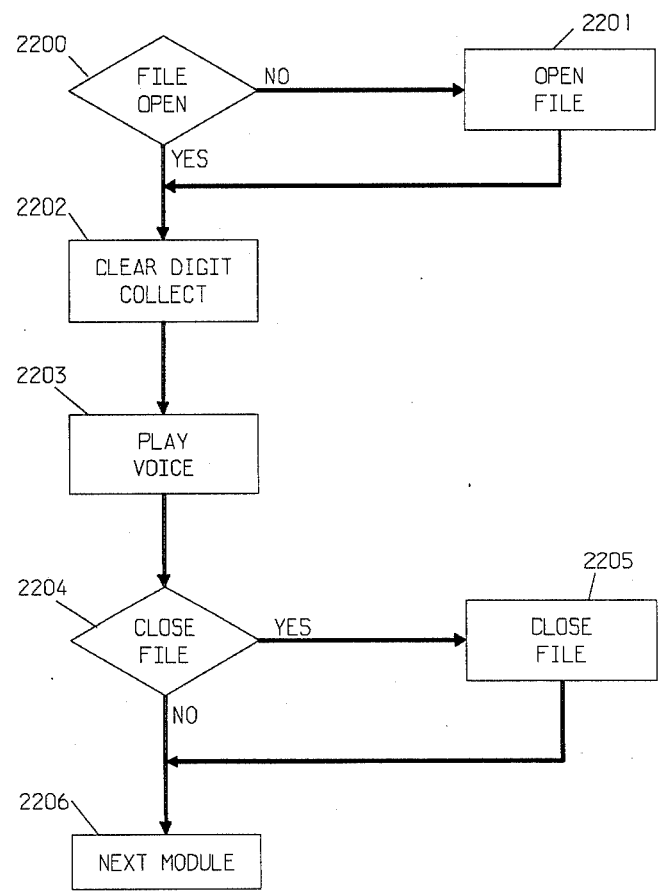
FIG. 22 shows the run-time flow of the Play Voice Interaction module.

FIG. 22 depicts the run-time flow for the Play-Voice module. If no file is open (2200) a file is opened (2201), digits collection is cleared (2202), a voice file is played (2203) and the producer can specify whether the file should be closed (2204, 2205) or go to the next module (2206). It functions like the Record-Voice module except that the requested voice file is played to the user rather than recorded from the user. There is no timeout condition, since control is never really relinquished to the user.

The demand form for the Play-Voice module takes the same arguments as those for the Record-Voice module. The options form for Play-Voice module takes several arguments. The "stop-play" argument is a string which, when input by the caller, will stop the output. The "close-file" argument permits the dialog producer to leave a voice file open if the Play-Voice module operates in concert with Record-Voice modules to provide a voice editing capability.

Figure 23:
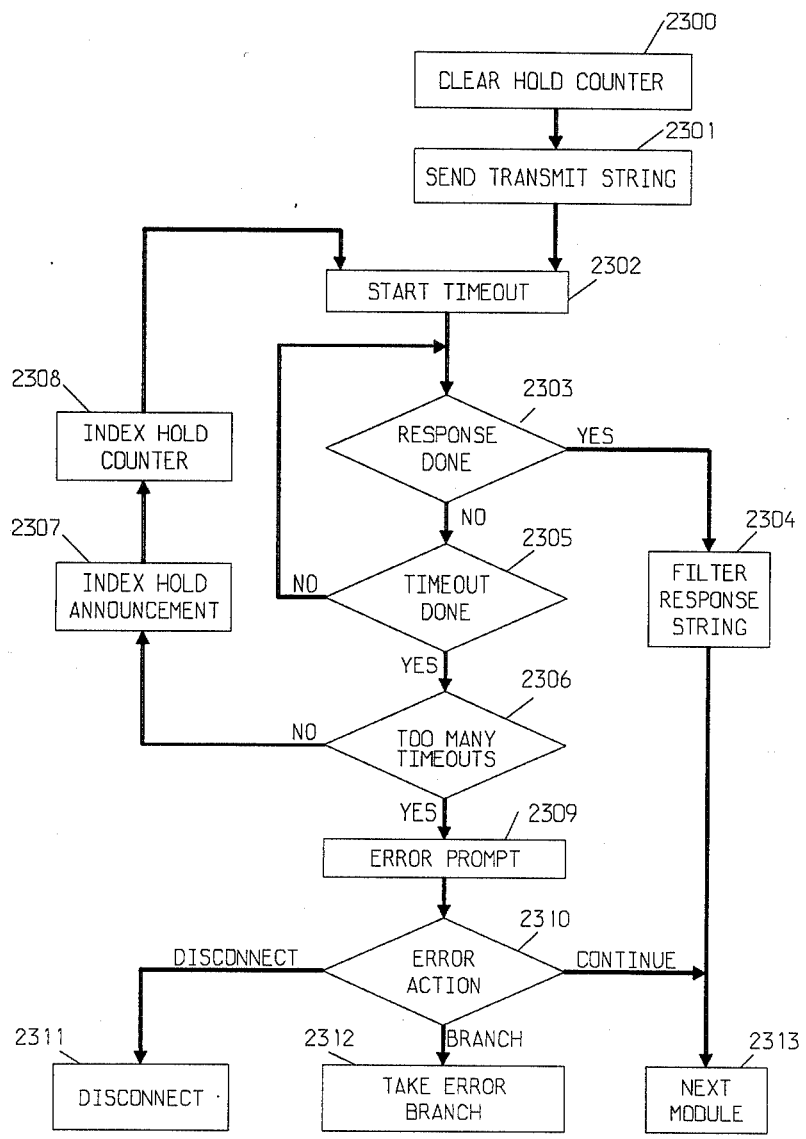
FIG. 23 shows the run-time flow of the Data Exchange module.

FIG. 23 depicts the run-time flow for the Data-Exchange module. This module provides communication between the DIVA application and other applications. Communication involves sending a string to the other application and awaiting a return string. At step (2300) a hold counter is cleared, the string is transmitted to the remote computer (2301), and a timeout clock is started (2302). At this point the DIVA application is prepared to receive a return string from the remote computer. Accumulating the return string is not explicitly represented in the flow chart, but is assumed to be occurring in the background.

If the response is not complete (2303), the module checks a timeout (2305), and rechecks for completion of the response (2303). Thus, the application tests for a fully accumulated response or a timeout.

If the timeout occurs before the response is completed, an announcement is played to the caller (2307). After it is issued, the timeout counter is restarted. The module checks the threshold for announcement repetitions (2306). If this threshold is exceeded, error treatment is provided in steps 2309 and 2310. The error action (2310) can be either a disconnect (2311), a producer specified error branch (2312) or go to the next module (2313).

If the response is collected, it is filtered to identify the portion that is significant (2304). This filtering can be used to strip off formatting information, special characters, or any other information that is returned from the other computer. After the response is filtered, it is checked for validity. If the result is valid, then control is transferred to the next interaction module.

If there are excessive announcements or an invalid response, the module issues an error prompt, clears the digit collector, and branches as required by the dialog producer. Although other interaction modules permit only two error actions, (explicit branching and disconnect) the Data-Exchange module also permits continuation. This allows data transmission with only an acknowledgment required. The options form for the Data-Exchange module allows the following alternatives to be set. The first argument is the text string that will be transmitted to the remote system (including variable substitution). The second argument is a format for response string filtering. The filtering language is a list of specifications, with each indicating how many lines, words, or characters to skip; a string to scan for; or a variable name that will be assigned a designated portion of the response string. For each variable in the response, an additional argument indicates a valid response. The formatted text argument that is required to specify a valid response was discussed earlier in the section on the Prompt-and-Collect module.

The error form for the Data-Exchange module takes the following arguments: time to hold, holding prompt, number of hold periods, action for excessive holds or invalid response, and the prompt for excessive holds or invalid response.

INSTALL MODE

After the producer's dialog has been specified and tested, through the use of the above-described "run-mode" facility, the DPS provides a way to install or "load" the specified dialog application program as a running service. The output of the specified dialog, particularly the Level 2 parameters, are entered into a library which is then linked with the executable run-modules to produce a working service.

What has been disclosed is merely illustrative of the present invention and other arrangement or methods can be implemented by those skilled in the art without departing from the spirit and scope of the present invention.

What is claimed is:

1. A method of enabling a system designer to generate a dialog application program for instructing a computer controlled voice response system for providing a user interactive voice service, said method comprising the steps of:
   selecting two or more interaction program modules from a group of predefined interaction program modules, each program module including one or more system designer selectable parameters for further defining a particular user transaction function to be performed by said program module and
   specifying the logical interconnection of said selected two or more program modules to generate said application program to provide said user interactive voice service.

2. The method of claim 1 wherein said program module selecting step includes the step of further selecting each of said program modules from a group including:
   an execution module for controlling interactions between a user and said system and
   a control module for specifying conditional functions to be performed by said program.

3. The method of claim 2 wherein said further selecting step includes choosing said execution module from a group of modules including:
   a. prompt and collect module for playing an announcement to said user and collects digits entered by said user;
   b. call attendant module for signaling attendant to handle the user transaction;
   c. announcement module for playing a predetermined announcement to user;
   d. record voice module for enabling user to leave a voice message;
   e. play voice module for playing the prerecorded user voice message; and
   f. data exchange module to get data specified by user.

4. The method of claim 2 wherein said further selecting step includes choosing said control module from a group of modules including:
   a. branch module for branching one of several branches of said dialog program depending on the input from the user;
   b. switch module for branching to one of several paths depending on predetermined information from said system;
   c. loop module for repeating a sequence a predetermined number of times; and
   d. match module for comparing two data strings and branches based on the outcome of the comparison.

5. The method of claim 1 including the steps of:
   editing an existing application program using said module selecting step and said interconnection specifying step
   running said application program generated during said editing step to simulate the operation thereof.

6. The method of claim 5 further including an installing step to install said application program in an associated communication system to operate voiceware equipment in said communication system under control of the associated control module.

7. The method of claim 1 further including tutoring step for training a system designer in the method of generating said application program.

8. The method of claim 1 wherein said module selecting step includes the step of:
   identifying a prompt or announcement signal to be outputted to a user in response to a user interaction with said application program.

9. Apparatus for enabling a system designer to generate a dialog application program for instructing a computer controlled values response system for providing a user interactive voice service, said apparatus comprising:
   a group of predefined interaction program module means, each program module means including two or more system designer selectable parameters for further defining a particular user transaction function to be performed by said program module means,
   means for selecting two or more program module means from said group of program module means and for selecting said parameters therein, and
   means for specifying the logical interconnection of said selected two or more program module means to generate said application program to provide said user interactive voice service.

* * * * *